US010458593B2

(12) United States Patent
Chow et al.

(10) Patent No.: US 10,458,593 B2
(45) Date of Patent: Oct. 29, 2019

(54) MAST SYSTEMS FOR AUTONOMOUS MOBILE ROBOTS

(71) Applicant: iRobot Corporation, Bedford, MA (US)

(72) Inventors: Patrick Chow, Santa Clarita, CA (US); Nikolai Romanov, Oak Park, CA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 16/106,628

(22) Filed: Aug. 21, 2018

(65) Prior Publication Data

US 2019/0032842 A1 Jan. 31, 2019

Related U.S. Application Data

(63) Continuation of application No. 15/620,658, filed on Jun. 12, 2017, now Pat. No. 10,100,968.

(51) Int. Cl.
*F16M 11/40* (2006.01)
*B25J 19/02* (2006.01)
(Continued)

(52) U.S. Cl.
CPC .............. *F16M 11/40* (2013.01); *A47L 9/009* (2013.01); *A47L 9/2805* (2013.01);
(Continued)

(58) Field of Classification Search
CPC ...... G03B 17/56; G03B 17/561; F16M 11/04; F16M 11/12; F16M 11/10; F16M 11/18;
(Continued)

(56) References Cited

U.S. PATENT DOCUMENTS 2,967,465 A * 1/1961 Berenson ............... B65H 75/50
198/470.1
3,144,104 A * 8/1964 Weir ....................... E04C 3/005
182/41
(Continued)

FOREIGN PATENT DOCUMENTS

EP 1 548 532 6/2005
JP 2002046088 2/2002

OTHER PUBLICATIONS

George Klein, "STEM" Space Manipulator Arm, Spar Aerospace (Canadian), 1970, 13 pages (Year: 1970).*
(Continued)

*Primary Examiner* — Clayton E. LaBalle
*Assistant Examiner* — Kevin C Butler
(74) *Attorney, Agent, or Firm* — Fish & Richardson P.C.

(57) ABSTRACT

A protractible and retractable mast system for an autonomous mobile robot includes an elongate flexible member including a first lateral end and a second lateral end, and a fastener having a first portion extending along a length of the first lateral end and a second portion extending along a length of the second lateral end. The flexible member is configured to be at least partially coiled within a body of the robot, and a portion of the flexible member is vertically movable away from the body when the flexible member is being uncoiled. The fastener is configured to connect the first lateral end to the second lateral end when the flexible member is being uncoiled, and disconnect the first lateral end from the second lateral end when the flexible member is being coiled.

25 Claims, 16 Drawing Sheets

(51) Int. Cl.
  *B65H 75/42* (2006.01)
  *B65H 75/44* (2006.01)
  *A47L 9/28* (2006.01)
  *A47L 9/00* (2006.01)
  *G03B 17/56* (2006.01)
  *F16M 11/18* (2006.01)
  *B25J 5/00* (2006.01)
  *B25J 18/06* (2006.01)
  *G03B 29/00* (2006.01)
  *E04C 3/00* (2006.01)
  *F16M 11/04* (2006.01)
  *F16M 11/42* (2006.01)
  *F16M 11/12* (2006.01)
  *F16M 11/10* (2006.01)

(52) U.S. Cl.
  CPC ............ *A47L 9/2852* (2013.01); *B25J 5/007* (2013.01); *B25J 18/06* (2013.01); *B25J 19/023* (2013.01); *B65H 75/425* (2013.01); *B65H 75/4402* (2013.01); *B65H 75/4486* (2013.01); *E04C 3/005* (2013.01); *F16M 11/046* (2013.01); *F16M 11/18* (2013.01); *F16M 11/42* (2013.01); *G03B 17/561* (2013.01); *G03B 29/00* (2013.01); *A47L 2201/04* (2013.01); *B65H 2701/371* (2013.01); *F16M 11/04* (2013.01); *F16M 11/10* (2013.01); *F16M 11/12* (2013.01); *G03B 17/56* (2013.01)

(58) Field of Classification Search
  CPC ...... A47L 9/009; A47L 9/2805; A47L 9/2852; B25J 19/023; B65H 75/425; B65H 75/4402; B65H 75/4486
  USPC .......................................................... 396/428
  See application file for complete search history.

(56) References Cited

U.S. PATENT DOCUMENTS

| | | | |
|---|---|---|---|
| 3,144,215 A * | 8/1964 | Klein | B64G 9/00 |
| | | | 242/388.6 |
| 3,252,173 A | 5/1966 | Robinsky | |
| 3,503,164 A | 3/1970 | Medal | |
| 3,696,568 A | 10/1972 | Berry | |
| 3,832,240 A * | 8/1974 | Kubo | B21C 37/105 |
| | | | 148/684 |
| 4,096,459 A | 6/1978 | Lowenhar | |
| 4,777,416 A | 10/1988 | George et al. | |
| 4,857,912 A | 8/1989 | Everett et al. | |
| 5,084,828 A | 1/1992 | Kaufman et al. | |
| 5,199,931 A * | 4/1993 | Easley | A63B 21/015 |
| | | | 482/110 |
| 5,201,814 A | 4/1993 | Kitchell et al. | |
| 5,448,696 A | 9/1995 | Shimada et al. | |
| 5,732,401 A | 3/1998 | Conway | |
| 5,793,900 A | 8/1998 | Nourbakhsh et al. | |
| 5,802,494 A | 9/1998 | Kuno | |
| 5,808,663 A | 9/1998 | Okaya | |
| 6,208,379 B1 | 3/2001 | Oya et al. | |
| 6,217,975 B1 | 4/2001 | Daton-Lovett | |
| 6,256,938 B1 | 7/2001 | Daton-Lovett | |
| 6,272,237 B1 | 8/2001 | Hashima | |
| 6,292,713 B1 | 9/2001 | Jouppi | |
| 6,389,329 B1 | 5/2002 | Colens | |
| 6,415,203 B1 | 7/2002 | Inoue et al. | |
| 6,445,978 B1 | 9/2002 | Takamura et al. | |
| 6,454,708 B1 | 9/2002 | Ferguson et al. | |
| 6,509,926 B1 | 1/2003 | Mills et al. | |
| 6,529,234 B2 | 3/2003 | Urisaka et al. | |
| 6,532,404 B2 | 3/2003 | Colens | |
| 6,542,788 B2 | 4/2003 | Hosonuma et al. | |
| 6,594,844 B2 | 7/2003 | Jones | |
| 6,602,574 B1 | 8/2003 | Daton-Lovett | |
| 6,658,325 B2 | 12/2003 | Zweig | |
| 6,690,134 B1 | 2/2004 | Jones et al. | |
| 6,718,232 B2 | 4/2004 | Fujita et al. | |
| 6,781,338 B2 | 8/2004 | Jones et al. | |
| 6,809,490 B2 | 10/2004 | Jones et al. | |
| 6,914,622 B1 | 7/2005 | Smith | |
| 6,917,855 B2 | 7/2005 | Gonzalez-Banos et al. | |
| 6,965,209 B2 | 11/2005 | Jones et al. | |
| 6,980,956 B1 | 12/2005 | Takagi et al. | |
| 7,117,190 B2 | 10/2006 | Sabe et al. | |
| 7,123,285 B2 | 10/2006 | Smith et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,199,817 B2 | 4/2007 | Mottur et al. | |
| 7,228,203 B2 | 6/2007 | Koselka et al. | |
| 7,289,881 B2 | 10/2007 | Ota et al. | |
| 7,289,883 B2 | 10/2007 | Wang et al. | |
| 7,332,890 B2 | 2/2008 | Cohen et al. | |
| 7,340,100 B2 | 3/2008 | Higaki et al. | |
| 7,388,343 B2 * | 6/2008 | Jones | G05D 1/0219 |
| | | | 318/568.12 |
| 7,388,879 B2 | 6/2008 | Sabe et al. | |
| 7,388,981 B2 | 6/2008 | Jouppi | |
| 7,389,156 B2 | 6/2008 | Ziegler et al. | |
| 7,430,455 B2 | 9/2008 | Casey et al. | |
| 7,448,113 B2 | 11/2008 | Jones et al. | |
| 7,467,026 B2 | 12/2008 | Sakagami et al. | |
| 7,515,992 B2 | 4/2009 | Sawada et al. | |
| 7,551,980 B2 | 6/2009 | Sakagami et al. | |
| 7,571,511 B2 | 8/2009 | Jones et al. | |
| 7,593,546 B2 | 9/2009 | Jouppi | |
| 7,624,438 B2 | 11/2009 | White et al. | |
| 7,631,834 B1 | 12/2009 | Johnson | |
| 7,636,982 B2 | 12/2009 | Jones et al. | |
| 7,643,051 B2 | 1/2010 | Sandberg et al. | |
| 7,702,420 B2 | 4/2010 | Goto et al. | |
| 7,706,917 B1 | 4/2010 | Chiappetta et al. | |
| 7,761,954 B2 | 7/2010 | Ziegler | |
| 8,077,963 B2 | 12/2011 | Wang et al. | |
| 8,359,122 B2 | 1/2013 | Koselka et al. | |
| 8,515,577 B2 | 8/2013 | Wang et al. | |
| 8,863,369 B2 | 10/2014 | Taylor | |
| 9,198,728 B2 | 12/2015 | Wang | |
| 9,376,600 B2 | 6/2016 | Gray | |
| 10,100,968 B1 * | 10/2018 | Chow | F16M 11/40 |
| 2001/0020837 A1 | 9/2001 | Yamashita et al. | |
| 2001/0024233 A1 | 9/2001 | Urisaka et al. | |
| 2001/0037163 A1 | 11/2001 | Allard | |
| 2002/0016649 A1 | 2/2002 | Jones | |
| 2002/0097322 A1 | 7/2002 | Monroe et al. | |
| 2002/0103576 A1 | 8/2002 | Takamura et al. | |
| 2002/0120364 A1 | 8/2002 | Colens | |
| 2002/0128746 A1 | 9/2002 | Boies et al. | |
| 2002/0165790 A1 | 11/2002 | Bancroft et al. | |
| 2002/0199007 A1 | 12/2002 | Clayton | |
| 2003/0023348 A1 | 1/2003 | Inoue et al. | |
| 2003/0025472 A1 | 2/2003 | Jones et al. | |
| 2003/0037250 A1 | 2/2003 | Walker | |
| 2003/0045203 A1 | 3/2003 | Sabe et al. | |
| 2003/0060930 A1 | 3/2003 | Fujita et al. | |
| 2003/0078696 A1 | 4/2003 | Sakamoto et al. | |
| 2003/0109960 A1 | 6/2003 | Nourbakhsh et al. | |
| 2003/0137268 A1 | 7/2003 | Papanikolopoulos et al. | |
| 2003/0151658 A1 | 8/2003 | Smith | |
| 2003/0167403 A1 | 9/2003 | McCurley | |
| 2003/0182117 A1 | 9/2003 | Monchi et al. | |
| 2003/0185556 A1 | 10/2003 | Stiepel et al. | |
| 2003/0229474 A1 | 12/2003 | Suzuki et al. | |
| 2004/0019406 A1 | 1/2004 | Wang et al. | |
| 2004/0020000 A1 | 2/2004 | Jones | |
| 2004/0049877 A1 | 3/2004 | Jones et al. | |
| 2004/0073368 A1 | 4/2004 | Gonzalez-Banos et al. | |
| 2004/0078219 A1 | 4/2004 | Kaylor et al. | |
| 2004/0089090 A1 | 5/2004 | Maeda | |
| 2004/0093650 A1 | 5/2004 | Martins et al. | |
| 2004/0102166 A1 | 5/2004 | Morita | |

(56) References Cited

U.S. PATENT DOCUMENTS

| | | | |
|---|---|---|---|
| 2004/0111273 A1 | 6/2004 | Sakagami et al. | |
| 2004/0113777 A1 | 6/2004 | Matsuhira et al. | |
| 2004/0117063 A1 | 6/2004 | Sabe et al. | |
| 2004/0137911 A1 | 7/2004 | Hull et al. | |
| 2004/0174129 A1 | 9/2004 | Wang et al. | |
| 2004/0187457 A1 | 9/2004 | Colens | |
| 2004/0202351 A1* | 10/2004 | Park | G05D 1/0234 |
| | | | 382/104 |
| 2004/0207355 A1 | 10/2004 | Jones et al. | |
| 2004/0210347 A1 | 10/2004 | Sawada et al. | |
| 2005/0009469 A1 | 1/2005 | Kotola | |
| 2005/0026631 A1 | 2/2005 | Hull | |
| 2005/0035862 A1 | 2/2005 | Wildman et al. | |
| 2005/0046373 A1 | 3/2005 | Aldred | |
| 2005/0067994 A1 | 3/2005 | Jones et al. | |
| 2005/0071047 A1 | 3/2005 | Okabayashi et al. | |
| 2005/0091684 A1* | 4/2005 | Kawabata | B25J 9/0003 |
| | | | 725/35 |
| 2005/0125098 A1 | 6/2005 | Wang et al. | |
| 2005/0156562 A1 | 7/2005 | Cohen et al. | |
| 2005/0171636 A1 | 8/2005 | Tani | |
| 2005/0197739 A1 | 9/2005 | Noda et al. | |
| 2005/0204717 A1 | 9/2005 | Colens | |
| 2005/0216124 A1 | 9/2005 | Suzuki | |
| 2005/0216126 A1* | 9/2005 | Koselka | B25J 5/007 |
| | | | 700/259 |
| 2005/0222711 A1 | 10/2005 | Yoshimi et al. | |
| 2005/0231357 A1 | 10/2005 | Kanayama et al. | |
| 2005/0234729 A1 | 10/2005 | Scholl | |
| 2005/0251292 A1* | 11/2005 | Casey | G05D 1/0238 |
| | | | 700/245 |
| 2006/0005254 A1 | 1/2006 | Ross | |
| 2006/0006316 A1 | 1/2006 | Takenaka | |
| 2006/0041333 A1 | 2/2006 | Anezaki | |
| 2006/0047803 A1 | 3/2006 | Shaik | |
| 2006/0052676 A1 | 3/2006 | Wang et al. | |
| 2006/0082642 A1 | 4/2006 | Wang | |
| 2006/0091297 A1 | 5/2006 | Anderson et al. | |
| 2006/0129848 A1 | 6/2006 | Paksoy | |
| 2006/0195226 A1 | 8/2006 | Matsukawa et al. | |
| 2006/0217837 A1 | 9/2006 | Koga et al. | |
| 2006/0259193 A1 | 11/2006 | Wang et al. | |
| 2006/0261207 A1* | 11/2006 | Woodruff | E04H 12/185 |
| | | | 242/473.3 |
| 2007/0008918 A1 | 1/2007 | Stanforth | |
| 2007/0027579 A1* | 2/2007 | Suzuki | G05D 1/0251 |
| | | | 700/245 |
| 2007/0043459 A1 | 2/2007 | Abbott et al. | |
| 2007/0046237 A1* | 3/2007 | Lakshmanan | F41H 7/005 |
| | | | 318/568.11 |
| 2007/0055116 A1 | 3/2007 | Clark et al. | |
| 2007/0060105 A1 | 3/2007 | Batta | |
| 2007/0061041 A1* | 3/2007 | Zweig | G05D 1/0261 |
| | | | 700/245 |
| 2007/0064092 A1 | 3/2007 | Sandberg et al. | |
| 2007/0198130 A1* | 8/2007 | Wang | G06F 19/3418 |
| | | | 700/259 |
| 2007/0266508 A1* | 11/2007 | Jones | A47L 5/30 |
| | | | 15/49.1 |
| 2008/0055409 A1 | 3/2008 | Mars et al. | |
| 2008/0140255 A1* | 6/2008 | Ziegler | A47L 5/14 |
| | | | 700/245 |
| 2008/0155768 A1 | 7/2008 | Ziegler et al. | |
| 2008/0167542 A1* | 7/2008 | Lampropoulos | A61B 90/06 |
| | | | 600/345 |
| 2008/0215185 A1* | 9/2008 | Jacobsen | B64G 1/16 |
| | | | 700/259 |
| 2008/0307590 A1 | 12/2008 | Jones et al. | |
| 2009/0249222 A1 | 10/2009 | Schmidt et al. | |
| 2009/0292393 A1 | 11/2009 | Casey et al. | |
| 2010/0049365 A1 | 2/2010 | Jones et al. | |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2010/0277584 A1* | 11/2010 | Price | F16M 11/18 |
| | | | 348/143 |
| 2011/0012003 A1* | 1/2011 | Woodruff | E04H 12/185 |
| | | | 248/404 |
| 2012/0159597 A1* | 6/2012 | Thomas | G06F 17/00 |
| | | | 726/7 |
| 2012/0173018 A1* | 7/2012 | Allen | G05D 1/0248 |
| | | | 700/245 |
| 2013/0117867 A1* | 5/2013 | Fung | G06F 21/88 |
| | | | 726/35 |
| 2014/0009561 A1* | 1/2014 | Sutherland | B25J 5/007 |
| | | | 348/14.05 |
| 2014/0048672 A1* | 2/2014 | Woodruff | F16M 11/40 |
| | | | 248/404 |
| 2014/0122116 A1 | 5/2014 | Smythe | |
| 2014/0230949 A1* | 8/2014 | Daton-Lovett | B64G 1/222 |
| | | | 138/177 |
| 2016/0010333 A1* | 1/2016 | Freebury | E04C 3/005 |
| | | | 52/646 |

OTHER PUBLICATIONS

"Facts on the Trilobite," Electrolux, accessed online <http://trilobite.electrolux.se/presskit_en/node1335.asp?print=yes&pressID=> Dec. 12, 2003, 2 pages.

"Meet iRobot, the smartest webcam on wheels," Telefriend, Wired Magazine, Issue 8.09, Sep. 2000, 4 pages.

"Welcome to the Electrolux Trilobite," Electrolux, accessed online <http://electroluxusa.com/node57.asp?currentURL=node142.asp%3F> Mar. 18, 2005, 2 pages.

Aly et al., "CompactKdt: Compact Signatures for Accurate Large Scale Object Recognition," IEEE Workshop on Applications of Computer Vision (WACV), Colorado, Jan. 2012, pp. 505-512.

Baker et al., "PCASSO: Applying and Extending State-of-the-Art Security in the Healthcare Domain," 1997 ACSA conf. Pgs.

Baltus et al., "Towards Personal Service Robots for the Elderly," Computer Science and Robotics, 2002.

Brooks, Sections from "Flesh & Machines, How Robots will Change Us" "Remote Presence," p. 131-147 Feb. 2002.

Cyberneticzoo.com, "STEM," Space Manipulartor Arm, http:cyberneticzoo.com/tag/storable-tubular-extendible-member/, 1970—"STEM" Space Manipulator Arm—George Klein, Spar Aerospace, Aug. 24, 2014.

Doty, K. L., and Harrison, R. R., "Sweep Strategies for a Sensory-Driven, Behavior-Based Vacuum Cleaning Agent," AAAI 1993 Fall Symposium Series, Instantiating Real-World Agents, Research Triangle Park, Raleigh, NC, Oct. 22-24, 1993, pp. 1-6.

Everett, H.R., "Sensors for Mobile Robots," AK Peters, Ltd., Wellesley, MA. (1995).

Goel et al., "Systematic Floor Coverage of Unknown Environments Using Rectangular Regions and Localization Certainty," 2013 IEEE/RSJ International Conference on Intelligent Robots and Systems (IROS 2013), Tokyo, Japan, Nov. 3-7, 2013, pp. 1-8.

Goncalves et al., "A Visual Front-end for Simultaneous Localization and Mapping," Proceedings of the 2005 IEEE International Conference on Robotics and Automation, Barcelona, Spain, Apr. 2005, pp. 44-49.

Gutmann et al., "A Constant-Time Algorithm for Vector Field SLAM Using an Exactly Sparse Extended Information Filter," IEEE Transactions on Robotics (vol. 28, Issue: 3), Jan. 2, 2012, pp. 650-667.

Gutmann et al., "Challenges of designing a low-cost indoor localization system using active beacons," Technologies for Practical Robot Applications (TePRA), 2013 IEEE International Conference on, Apr. 22-23, 2013, pp. 1-6.

Gutmann et al., "Localization in a vector field map," 2012 IEEE/RSJ International Conference on Intelligent Robots and Systems, pp. 3144-3151.

Gutmann et al., "The Social Impact of a Systematic Floor Cleaner," Advanced Robotics and its Social Impacts (ARSO), 2012 IEEE Workshop on, 2012, pp. 50-53.

Gutmann et al., "Vector Field SLAM," IEEE Transactions on Robotics, 2012, pp. 650-667.

(56) References Cited

OTHER PUBLICATIONS

Hitachi: News release: The home cleaning robot of the autonomous movement type (experimental machine) is developed. May 29, 2003. Accessed online Mar. 18, 2005 <http://www.i4u.com/japanreleases/hitachirobot.htm> 5 pages.

Honda Motor Co., Ltd., English Translation of JP11212642, dated Aug. 9, 1999, 31 pages.

International Search Report and Written Opinion in International Patent Application No. PCT/US2017/59086, dated Jan. 26, 2018, 8 pages.

Jeong, WooYeon et al., "CV-SLAM: A new Ceiling Vision-based SLAM technique," 2005 IEEE/RSJ International Conference on Intelligent Robots and Systems, Aug. 2-6, 2005, pp. 3195-3200.

Jones, J., Roth, D. (Jan. 2, 2004). Robot Programming: A Practical Guide to Behavior-Based Robotics. McGraw-Hill Education Tab; 288 pages.

Karcher RC 3000 Robotic Cleaner, Product page, accessed online <http://www.karcher-usa.com/showproducts.php?op=view_prod&param1=143&param2=&param3=> Mar. 18, 2005, 3 pages.

Karcher RoboCleaner RC 3000, Dec. 12, 2003, 4 pages.

Karcher, Product Manual Download, 2003, 16 pages.

Karlsson et al., "The vSLAM Algorithm for Navigation in Natural Environments," Korean Robotics Society Review, vol. 2, No. 1, pp. 51-67, 2005.

Masys et al. "Patient-Centered Access to Secure Systems Online (PCASSO): A Secure Approach to Clinical Data Access via the World Wide Web," Proc pf 1997 AMIA Fall Symp. pp. 340-343.

Munich et al., "Application of Visual Pattern Recognition to Robotics and Automation," IEEE Robotics & Automation Magazine, pp. 72-77, 2006.

Munich et al., "SIFT-ing Through Features with ViPR," IEEE Robotics & Automation Magazine, Sep. 2006, pp. 72-77.

Prassler, et al., English Translation of DE19849978, dated Feb. 8, 2001, 16 pages.

Stanford, "Pervasive Health Care Applications Face Tough Security Challenges," Pervasive Computing, 2002 IEEE, pp. 8-12.

Urquart, "InTouch's robotic Companion 'beams up' healthcare experts", Medical Device Daily, vol. 7, No. 39, Feb. 27, 2003, p. 1,4.

Yamamoto et al., "Optical Sensing for Robot Perception and Localization," IEEE Workshop on Advanced Robotics and its Social Impacts, 2005, Jun. 12-15, 2005, pp. 14-17.

\* cited by examiner

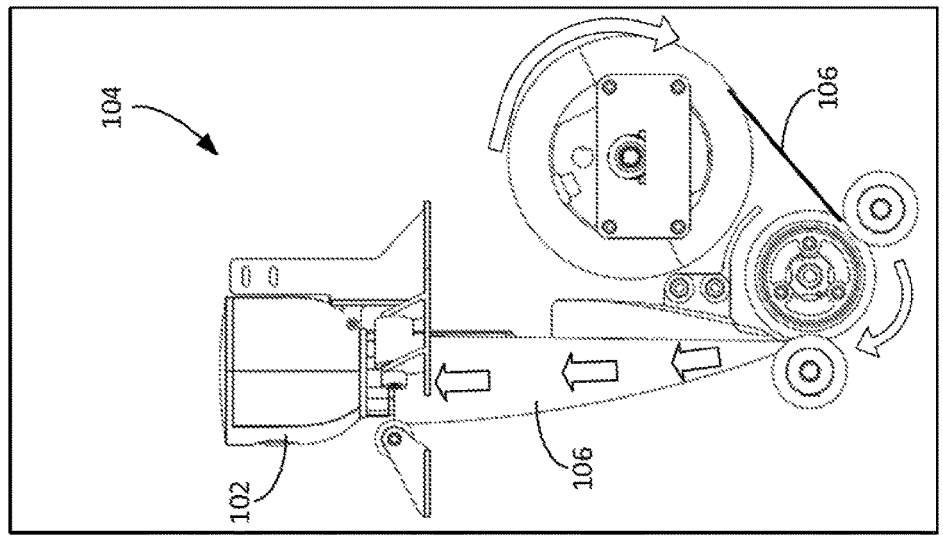
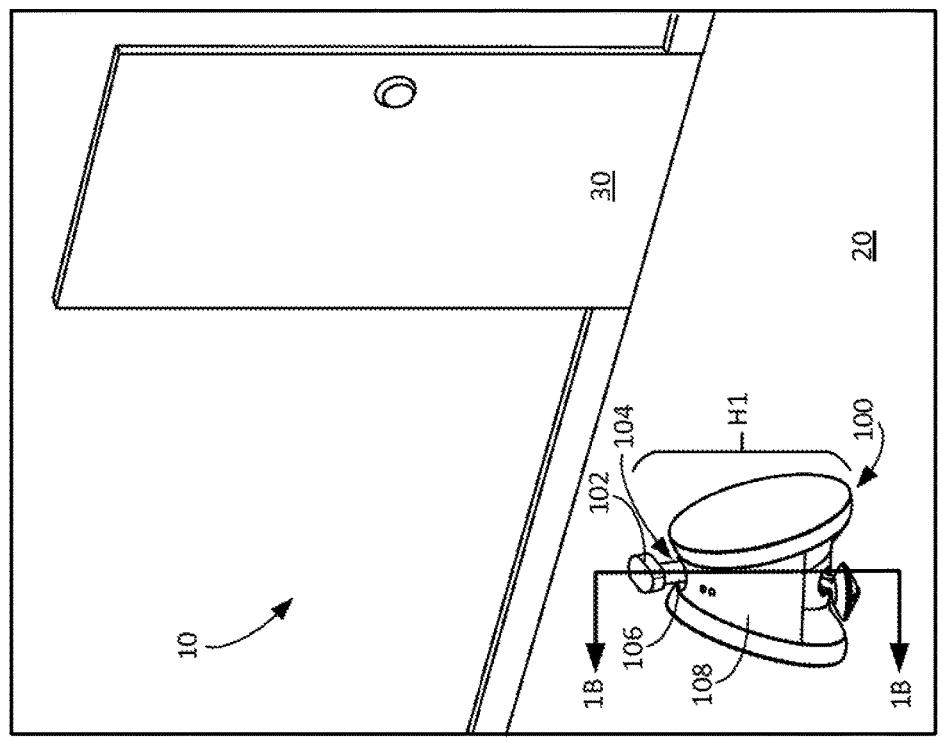
FIG. 1B
FIG. 1A

MAST SYSTEMS FOR AUTONOMOUS MOBILE ROBOTS

CROSS-REFERENCE TO RELATED APPLICATIONS

This application is a continuation of and claims priority to U.S. application Ser. No. 15/620,658, filed on Jun. 12, 2017, the entire contents of which are hereby incorporated by reference.

TECHNICAL FIELD

This specification relates to mast systems for autonomous mobile robots.

BACKGROUND

Autonomous mobile robots can be operated in environments to perform tasks such as floor cleaning, lawn mowing, or patrolling. In addition to including systems for performing these tasks, autonomous mobile robots can house drive mechanisms that propel the robots autonomously through their environments. As the robots autonomously move, the drive mechanisms can be controlled to maneuver the robots about obstacles in the environments.

SUMMARY

In one aspect, an autonomous mobile robot includes a body, a drive configured to maneuver the body across a floor surface, an image capture device, an interface cable connecting the image capture device to a controller of the robot, and an elongate flexible member having a portion coupled to the image capture device. The interface cable is configured to be retractably spooled within the body, and the flexible member is configured to be at least partially coiled within the body of the robot. The portion of the flexible member is vertically movable with the image capture device away from the body when the flexible member is being uncoiled and extended along a longitudinal axis. The flexible member is configured to form a conduit around a portion of the interface cable between the body and the image capture device and to support the image capture device above the body of the robot when the portion of the flexible member and the image capture device move away from the body.

In another aspect, a protractible and retractable mast system for an autonomous mobile robot includes an elongate flexible member including a first lateral end and a second lateral end, and a fastener having a first portion extending along a length of the first lateral end and a second portion extending along a length of the second lateral end. The flexible member is configured to be at least partially coiled within a body of the robot, and a portion of the flexible member is vertically movable away from the body when the flexible member is being uncoiled. The fastener is configured to connect the first lateral end to the second lateral end when the flexible member is being uncoiled, and disconnect the first lateral end from the second lateral end when the flexible member is being coiled.

In some implementations, the flexible member includes a section having a first lateral end and a second lateral end. The section of the flexible member can be configured such that a distance between the first lateral end and the second lateral end when the section of the flexible member is coiled is larger than a distance between the first lateral end and the second lateral end when the section of the flexible member is uncoiled.

In some implementations, the flexible member is configured to be substantially flat when coiled within the body. The flexible member can be configured to be curled about the longitudinal axis to form the conduit when uncoiled and vertically extended from the body.

In some implementations, a top surface of the image capture device is configured to be flush with a top surface of the body when the flexible member and image capture device are retracted within the body.

In some implementations, the flexible member includes a first lateral edge configured to be fastened to a second lateral edge of the flexible member to form the conduit around the portion of the interface cable. The interface cable and the flexible member can be configured to be separately spooled within the body when the first lateral end of the flexible member is unfastened from the second lateral end of the flexible member.

In some implementations, the flexible member includes a first lateral edge and a second lateral edge. The robot or the mast system can further include a fastener having a first portion extending along a length of the first lateral edge and a second portion extending along a length of the second lateral edge. The fastener can be configured to connect the first lateral edge to the second lateral edge to form the conduit around the portion of the interface cable when the flexible member is being uncoiled, and disconnect the first lateral edge from the second lateral edge when the flexible member is being coiled within the body. In some cases, the fastener includes a zipper, a hook-and-loop fastener, or a magnetic fastener. In some cases, the robot or the mast system further includes a fastening and unfastening device positioned below a top surface of the body. The fastening and unfastening device can be configured to connect the first portion of the fastener to the second portion of the fastener such that the flexible member forms the conduit around the portion of the interface cable when the image capture device moves vertically away from the body. The fastening and unfastening device can be configured to disconnect the first portion of the fastener from the second portion of the fastener when the portion of the flexible member is retracted toward the body. In some cases, the fastener is attached to an outer cloth layer of the flexible member.

In some implementations, the robot or the mast system further includes a spool assembly having an outer portion about which the flexible member is configured to be coiled, and an inner portion about which the interface cable is configured to be coiled. In some cases, the spool assembly defines a slit through the outer portion of the spool assembly. The interface cable can extend through the slit to engage the inner portion of the spool assembly. In some cases, the interface cable is configured to contact an inner surface of the outer portion of the spool assembly when the interface cable is coiled about the inner portion of the spool assembly. The inner surface of the outer portion can face the inner portion of the spool assembly.

In some implementations, the robot or the mast system further includes a drive roller contacting the flexible member. The drive roller can be rotatable in a first direction to cause the flexible member to be uncoiled and to move vertically away from the body, and in a second direction to cause the flexible member to be coiled and to cause the portion of the flexible member to retract toward the body. In some cases, the robot or the mast system further includes a motor positioned within the drive roller and between outer lateral ends of the drive roller. The motor can be configured to rotate the drive roller in the first direction or the second direction. In some cases, the robot or the mast system further includes a compressor roller positioned to contact the flexible member to compress another portion of the flexible member against the drive roller. In some cases, the robot or the mast system further includes a ramp extending away from the drive roller from a first end proximate the drive roller to a second end proximate a location on the body through which the flexible member is movable to an exterior of the body. The ramp can be configured to contact the flexible member to inhibit the flexible member from buckling.

In some implementations, the portion of the flexible member is positioned proximate a first longitudinal end of the flexible member, and another portion of the flexible member is positioned proximate a second longitudinal end of the flexible member. The robot or the mast system can further include a spring to apply tension to the flexible member at the other portion of the flexible member.

In some implementations, the robot or the mast system further includes a sensor to detect motion of the flexible member. The controller can be configured to determine a length of an uncoiled portion or a length of a coiled portion of the flexible member based on the detected motion of the flexible member. In some cases, the sensor includes an encoder operably connected to a motor to drive the flexible member away from the body of the robot. In some cases, the sensor includes an optical sensor to detect motion of the flexible member.

In some implementations, a height of the body of the robot above the floor surface is between 0.15 and 0.35 meters, an area footprint of the body of the robot is less than 0.5 meters, and the image capture device is movable to a height above the floor surface between 0.5 and 2.5 meters.

In some implementations, the robot or the mast system further includes a rigid nest positioned within the body of the robot. The rigid nest can be to receive the image capture device when the image capture device is in a fully retracted position.

Advantages of the foregoing may include, but are not limited to, the advantages described below and herein elsewhere. The flexible member and a sensor mounted to the flexible member can be easily retracted into the body of the robot so that the sensor can be operated in privacy modes in which the sensor cannot monitor the environment. This can improve comfort of occupants in the environment when privacy is desired.

The flexible member can also occupy a relatively small amount of space when the flexible member is in a retracted state and coiled within the body of the robot. The flexible member, when coiled, can be substantially flat so that the flexible member can be tightly coiled within the body. As a result of the relatively small amount of space needed to store the flexible member within the body of the robot, a size of the robot body can be more compact. This enables the robot to fit more easily in tight spaces in an environment of the robot, thus improving obstacle avoidance and allowing the robot to be more easily stored when not in use.

In addition, the interface cable can be retracted in a controlled manner that can inhibit tangles and kinks to the cable as the cable is drawn into the body. For example, the cable can be spooled within the body, thereby allowing the cable to be more neatly arranged within the body. Improved management of the cable can reduce the risk that the cable is damaged during the retraction process.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIGS. 1A and 1C are perspective views of an autonomous mobile robot monitoring a door of an environment.

FIGS. 1B and 1D are side views of a mast system isolated from the robot of FIGS. 1A and 1C, respectively.

DETAILED DESCRIPTION

Figure 1D:
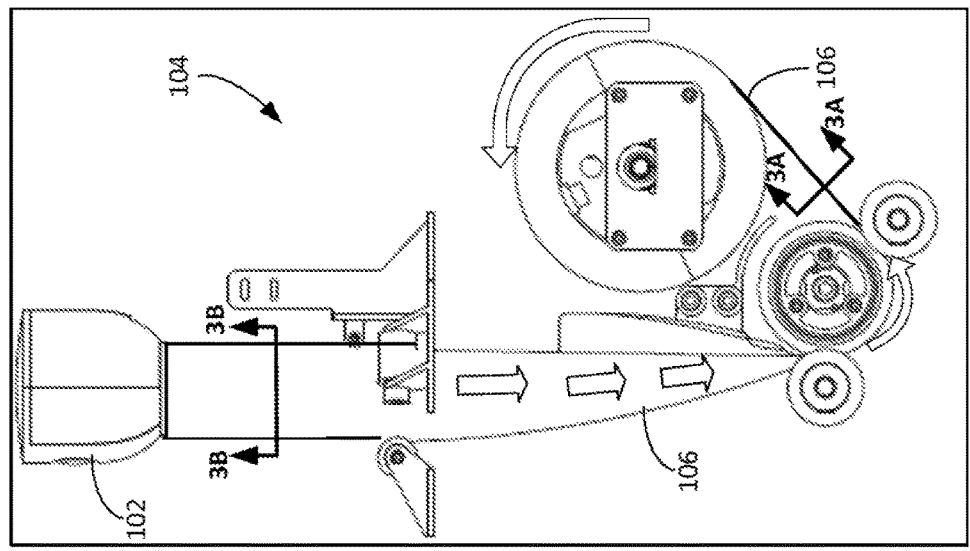

Referring to FIG. 1A, a monitoring system includes an autonomous mobile robot 100 including an image capture device 102 such as a camera to capture digital imagery of an environment 10 of the robot 100. The monitoring system provides data, e.g., digital imagery data, that enables remote surveillance and monitoring of locations throughout the environment 10. The robot 100 operates in an autonomous manner without user intervention by autonomously traversing the environment 10 while capturing imagery using the image capture device 102. The image capture device 102 is moved vertically relative to a floor surface 20 to enable the image capture device 102 to capture imagery of the environment 10 at different heights. In the example depicted in FIG. 1A, the robot 100 monitors a door 30 in the environment 10 by directing its image capture device 102 at the door 30 to capture imagery of the door 30.

Referring also to FIG. 1B, the robot 100 includes a mast system 104 that enables the image capture device 102 to be moved vertically. The mast system 104 includes a flexible member 106 that supports the image capture device 102 above a body 108 of the robot 100. The flexible member 106 is a vertically extendible member that is capable of being retracted into the body 108 or protracted from the body 108 to move the image capture device 102 to different heights.

Figure 1C:
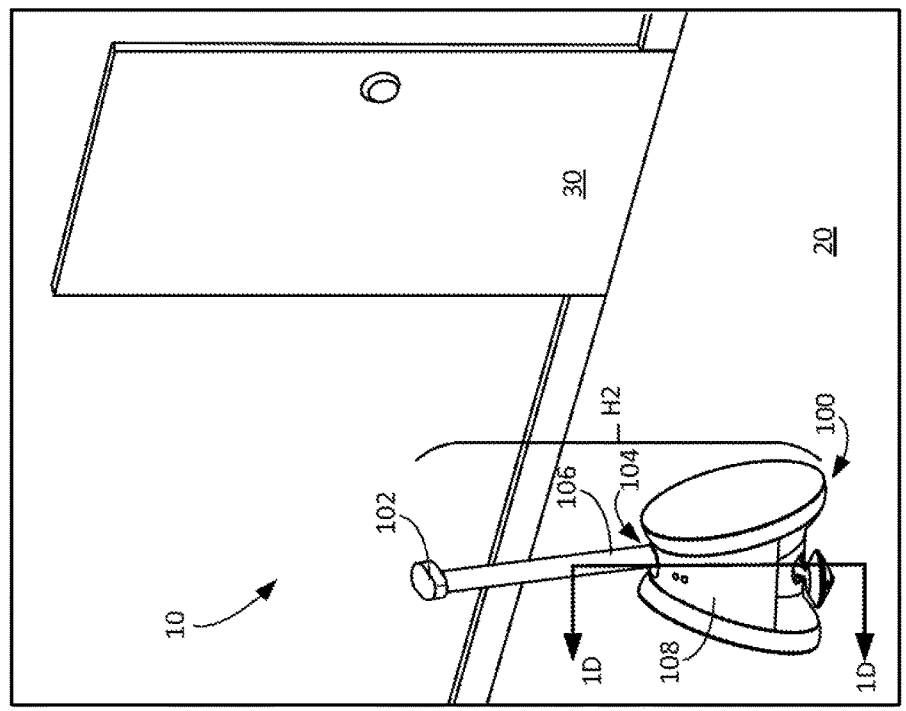

FIG. 1B shows a configuration of the mast system 104 of the robot 100 for positioning the image capture device 102 at a height H1 above the floor surface 20 as depicted in FIG. 1A. As shown in FIG. 1B, the flexible member 106 is controllable so that the image capture device 102 moves vertically (from the lower height H1 to the greater height H2 as depicted in FIG. 1C.) away from the height H1, e.g., toward a height H2 depicted in FIG. 1C. FIG. 1D shows a configuration of the mast system 104 of the robot 100 in which the image capture device 102 is positioned at a height H2 above the floor surface 20 as depicted in FIG. 1C. As shown in FIG. 1D, the flexible member 106 is controllable so that the image capture device 102 moves vertically towards the floor surface 20 from the height H2, e.g., toward the height H1 (so that the image capture device 102 is lowered from the greater height H2 to the lower height H1).

As described herein, during operations to move the image capture device 102 vertically, the flexible member 106 can be drawn into or fed out of the robot 100 from a spooled configuration within the body 108 of the robot 100. By being stored in this spooled configuration, the flexible member 106 can occupy a relatively small amount of space within the body 108 of the robot 100, thus enabling the robot 100 to have a smaller overall profile.

Figure 2A:
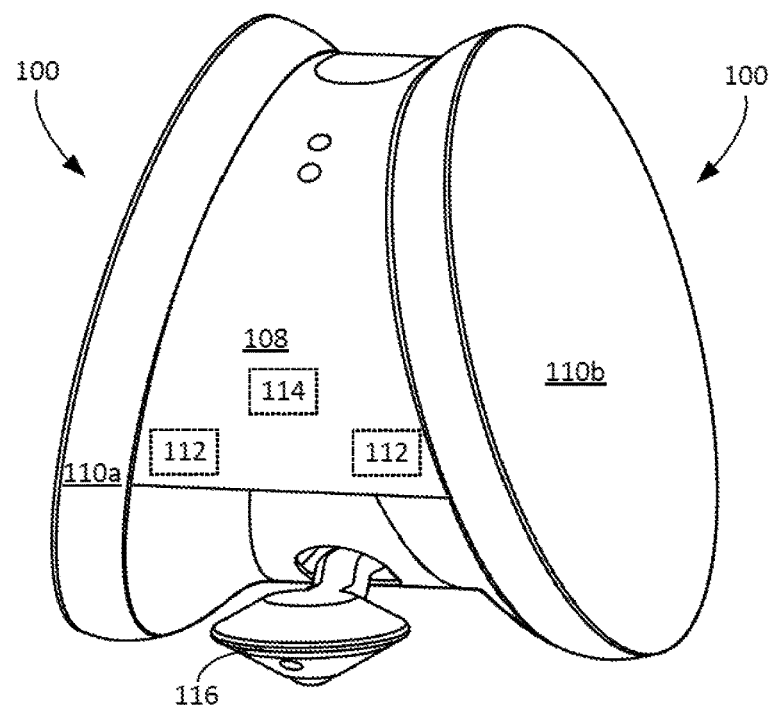
FIGS. 2A and 2B are rear perspective and bottom views of an autonomous mobile robot.

FIGS. 2A-2E illustrate an example of the robot 100. Referring to FIG. 2A, the robot 100 includes a drive that is operable to maneuver the robot 100 about a floor surface (e.g., the floor surface 20 shown in FIGS. 1A and 1C). The drive of the robot 100 includes any suitable mechanism or system for actively and controllably causing the robot 100 to transit through the environment 10. For example, the drive includes drive wheels 110a, 110b that support the body 108 of the robot 100 above the floor surface and one or more motors 112 (represented by dashed lined boxes to indicate their locations within the body 108) engaged to the drive wheels 110a, 110b. The drive wheels 110a, 110b are rotatably driven by the one or more motors 112. The one or more motors 112 are controllable by a controller 114 (represented by a dashed line box to indicate its location within the body 108) of the robot 100. In some implementations, the one or more motors 112 includes two distinct motors, with one motor being operable to control rotation of the drive wheel 110a, another motor being operable to control rotation of the drive wheel 110b.

The robot 100 has a substantially trapezoidal profile such that a center of mass of the robot 100 is closer to the floor surface 20 for added stability as the robot 100 transits along the floor surface 20. The body 108 houses electromechanical systems of the robot 100, including the one or more motors 112, the controller 114, portions of the mast system 104, and other systems enabling autonomous function of the robot 100. In some implementations, the electromechanical systems include a power system, a sensor system, or both. The power system includes a battery and a battery charging system configured to electrically connect the battery to a docking station. In this regard, the robot 100 is capable of operating with energy stored on the battery to move about the environment 10 and capture digital imagery and is connectable to the docking station to recharge the battery.

The sensor system includes an image sensor of the image capture device 102. In some examples, the image capture device 102 includes the image sensor, a housing for the image sensor, a lens to transmit received light from the environment 10 to the image sensor, and other components enabling operation of the image sensor for image capture.

The sensor system also includes sensors (e.g., navigation sensors) usable by the controller 114 to navigate about the environment 10. The navigation sensors generate signals for estimating a position of the robot 100 within the environment 10, for detecting objects and obstacles within the environment 10, and for generating a robot map, e.g., an occupancy map of the enclosure space 10. These navigation sensors include, for example, dead reckoning sensors, obstacle detection and avoidance (ODOA) sensors, simultaneous localization and mapping (SLAM) sensors, etc. The navigation sensors include, in some cases, the image sensor of the image capture device 102 for visual identification of features and landmarks used in calculating robot pose on the robot map. The navigation sensors alternatively or additionally include proximity sensors, contact sensors, motion sensors, cliff sensors, or a combination thereof.

In some implementations, the robot 100 further includes a rear stability wheel 116, e.g., a caster wheel, that extends rearward from the body 108 and cooperates with the drive wheels 110a, 110b to support the body 108 above the floor surface. In some cases, the stability wheel 116 is movable relative to the body 108, and the robot 100 includes a motor operably connected to the stability wheel 116 to move the stability wheel 116 relative to the body 108. The stability wheel 116 is movable into an interior of the robot 100.

Figure 2B:
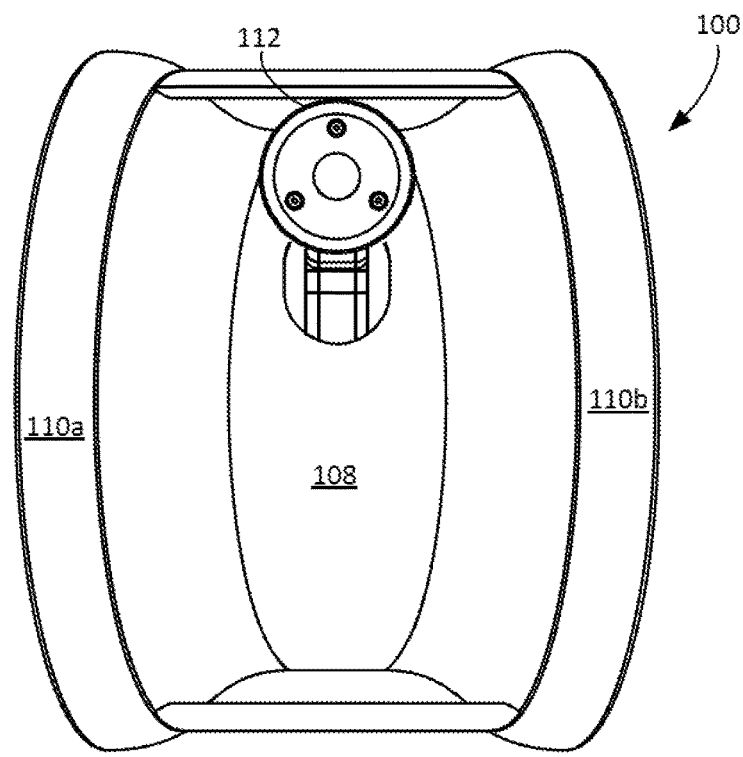

Referring to FIG. 2B, which shows a bottom view of the robot 100, a footprint of the robot 100 on the floor surface is defined by exterior components of the robot 100, such as the body 108 and the drive wheels 110a, 110b. In some examples, the area of the footprint is less than 0.5 square meters, e.g., less than 0.1 square meters, less than 0.3 square meters, less than 0.05 square meters. The smaller area footprint can enable the robot 100 to be easily stored when it is not being operated and to more easily transit between rooms of an environment. If the environment is cluttered, e.g., having many obstacles and having relatively small traversable areas, the smaller area footprint of the robot 100 can enable the robot 100 to maneuver between and around the obstacles without contacting the obstacles.

Figure 2C:
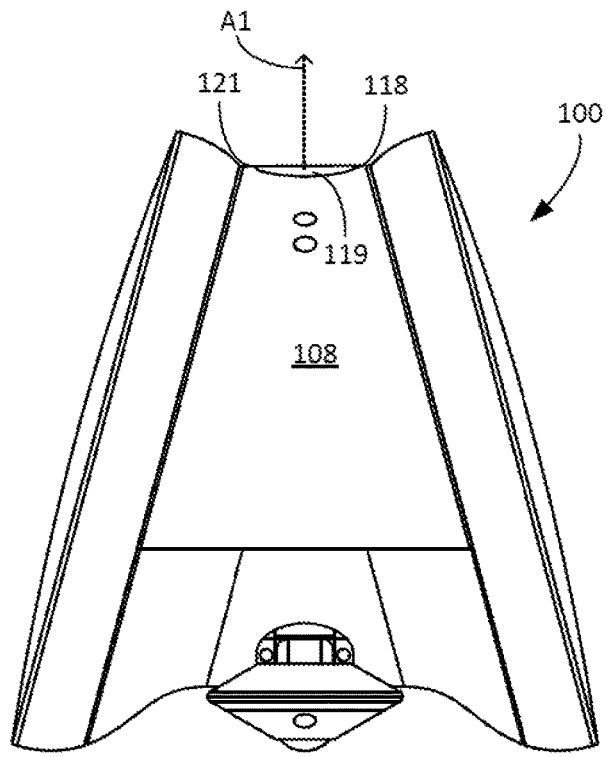
FIGS. 2C and 2D are rear views of the robot of FIG. 2A with a mast system of the robot in a retracted state and a protracted state, respectively.
Figure 2D:
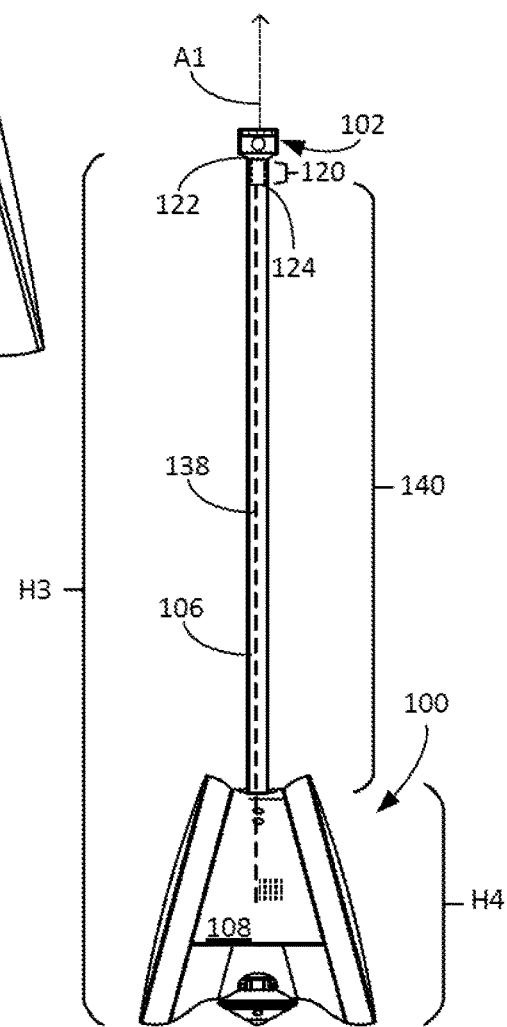

Referring to FIGS. 2C and 2D, the body 108 includes an opening 118 through which the image capture device 102 and the flexible member 106 extend from within the body 108 to outside of the body 108 or retract from outside of the body 108 to within the body 108. A distal portion 120 of the flexible member 106, e.g., a distal end of the flexible member 106, is coupled to the image capture device 102 such that movement of the distal portion 120 causes movement of the image capture device 102. For example, the flexible member 106 is attached to a housing 122 of the image capture device 102. The housing 122 is a rigid structure, e.g., formed from a metal such as aluminum or steel or formed from a rigid polymer such as a polycarbonate, acrylonitrile butadiene styrene, or nylon, that supports the image capture device 102. The distal portion 120 of the flexible member 106 is wrapped around an outer surface of a bottom portion 124 of the housing 122 to attach the flexible member 106 to the housing 122.

FIG. 2C illustrates the robot 100 with the image capture device 102 and the flexible member 106 are in fully retracted positions. When the flexible member 106 and the image capture device 102 are in the fully retracted positions, a top surface 119 of the image capture device 102 is substantially flush or entirely flush with a top surface 121 of the body 108. For example, the image capture device 102 is positioned between 0 and 1 cm from the top surface 121 of the body 108, e.g., between 0 and 0.3 cm, 0.3 cm and 0.7 cm, or 0.7 cm and 1 cm from the top surface 121 of the body 108, when the image capture device 102 is in the fully retracted position. In addition, in the fully retracted position of the flexible member 106, an image sensor of the image capture device 102 is positioned within the body 108 such that the image sensor cannot capture digital imagery of the environment 10. The image capture device 102 can be placed into the fully retracted position, for example, to provide privacy for human occupants of the environment 10. In some examples, the image capture device 102 can be placed into the fully retracted position to protect the image capture device 102 as the robot 100 traverses the environment 10 or when the robot 100 is stored. In addition, the robot 100 has a more compact profile when the image capture device 102 is fully retracted, thereby enabling the robot 100 to be more easily stored.

FIG. 2D illustrates the robot 100 when the image capture device 102 and the flexible member 106 are in fully protracted positions. The flexible member 106 and the image capture device 102 are movable along a longitudinal axis A1, e.g., a vertical axis extending through the opening 118 from which the flexible member 106 is protracted. In some examples, a maximum height H3 of the flexible member 106 above the floor surface (shown in FIG. 2D) is between 0.5 and 2.5 meters, e.g., between 0.5 and 1.5 meters, 1.0 and 2.0 meters, or 1.5 and 2.5 meters. The maximum height H3 of the flexible member 106 corresponds to the maximum height of the image capture device 102 in the fully protracted position. The body 108 of the robot 100 has a height H4 above the floor surface between 0.15 and 0.5 meters, e.g., between 0.15 and 0.3 meters, 0.15 and 0.4 meters, or 0.15 and 0.35 meters. The height H4 corresponds to the height of the image capture device 102 in the fully retracted position. The height H4 of the body 108 is between 10 and 40% of the maximum height H3 of the flexible member 106, e.g., between 10 and 30%, 15 and 35%, or 20 and 40% of the maximum height H3.

Figure 2E:
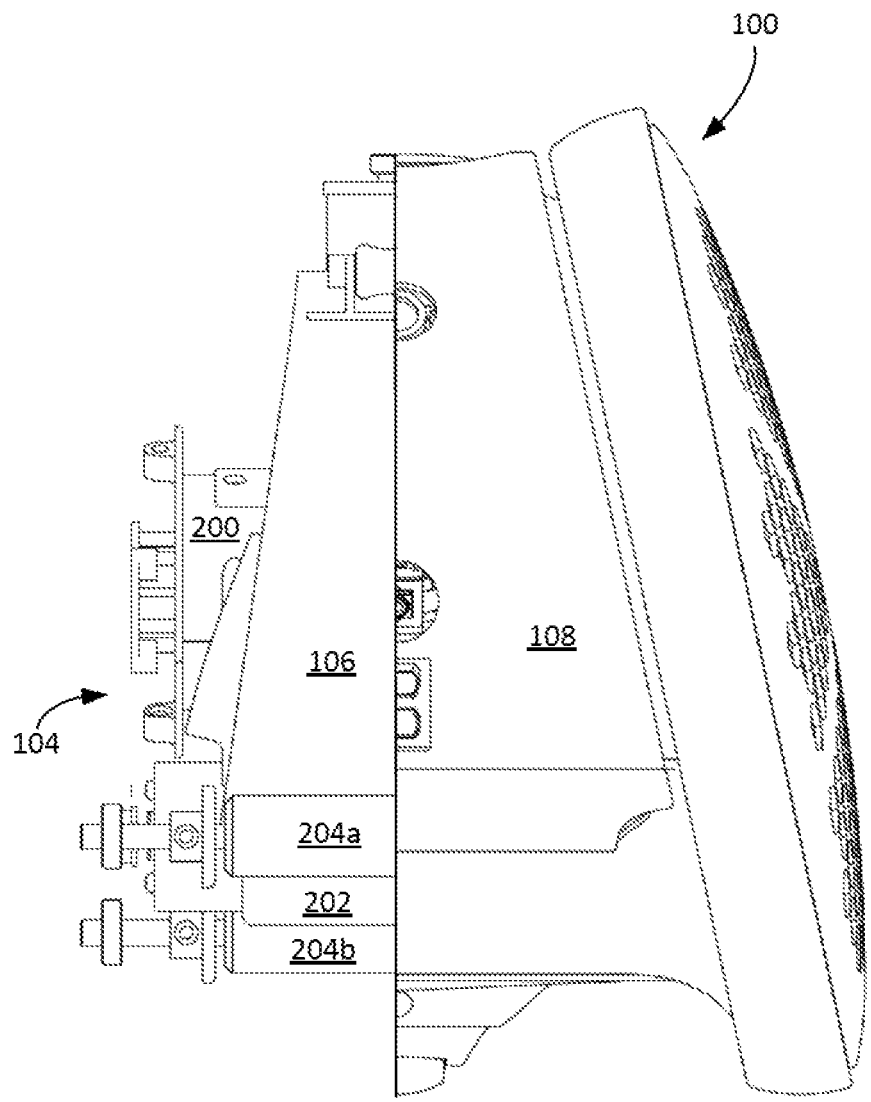
FIG. 2E is a partial cutaway front view of the robot of FIG. 2A, with a left portion of the front view showing internal components isolated from the robot and a right portion of the front view showing an exterior of the robot.

Referring to FIG. 2E, the mast system 104 includes portions housed within the body 108 that cooperate with one another to extend the flexible member 106 from the body 108 or retract the flexible member into the body 108. The mast system 104 includes a spool assembly 200, a drive roller assembly 202, and one or more compressing rollers 204a, 204b (collectively referred to as compressing rollers 204). The flexible member 106 is routed through the body 108 of the robot 100 along an outer surface of the drive roller assembly 202, along outer surfaces of the one or more compressing rollers 204, and along an outer surface of the spool assembly 200. In addition, an interface cable 138 (e.g., a ribbon cable as shown in FIG. 3B) is also routed through the body 108 of the robot 100 and can be coiled about the spool assembly 200, e.g., separately from the flexible member 106. The mast system 104 is further described with respect to FIGS. 5A, 5B, 6A-6D, and 7A-7C.

Referring back to FIG. 1B, the mast system 104 coils and uncoils the flexible member 106 to retract or protract, respectively, the flexible member 106. The distal portion 120 (shown in FIG. 2D) of the flexible member 106 and the image capture device 102 are retracted into the body 108 as the flexible member 106 is coiled, and are protracted from the body 108 as the flexible member 106 is uncoiled. A lengthwise section of the flexible member 106 is capable of being coiled within the body 108 when the section of the flexible member 106 is in a flattened configuration. When the lengthwise section of the flexible member 106 is uncoiled, the lengthwise section is transitioned from the flattened configuration to a curled configuration.

Figure 3A:
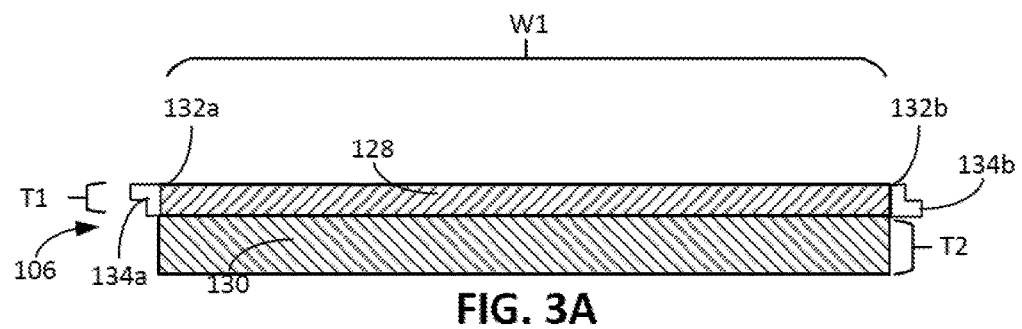
FIG. 3A is a cross-sectional view of a flexible member through section lines 3A-3A shown in FIG. 1D.
Figure 3B:
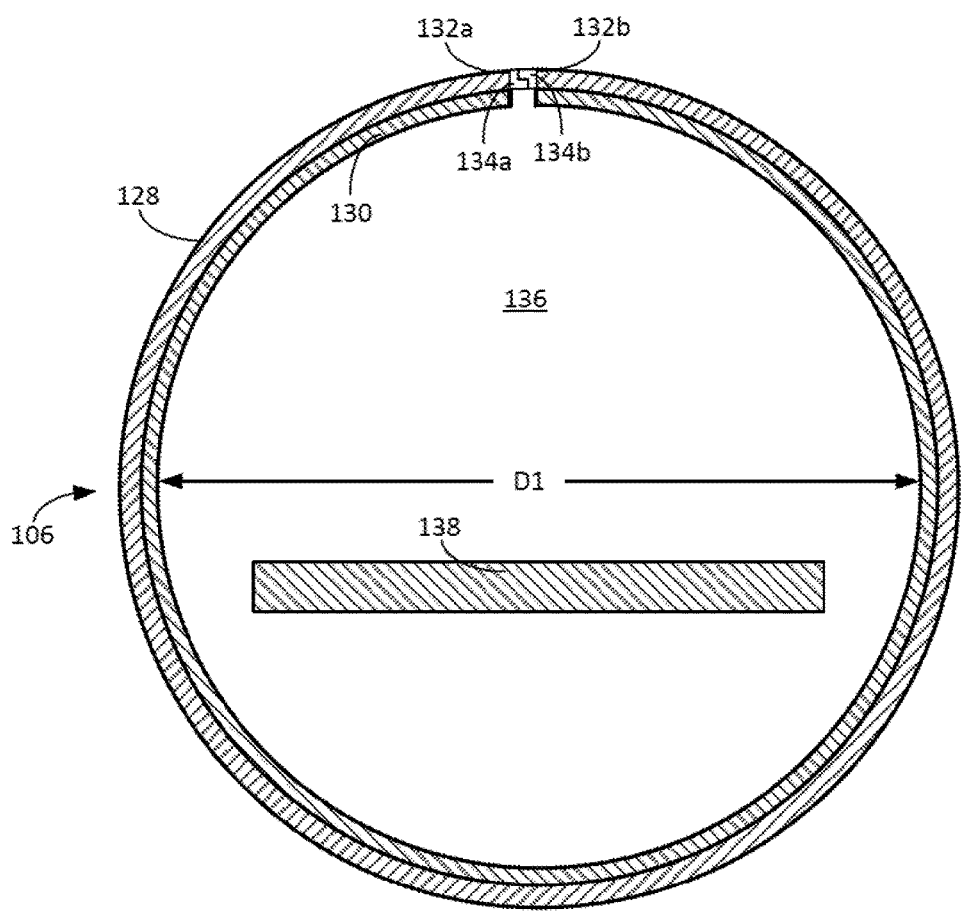
FIG. 3B is a cross-sectional view of a flexible member and an interface cable through section lines 3B-3B shown in FIG. 1D.

FIG. 3A shows a cross-section of a lengthwise section of the flexible member 106 along section lines 3A-3A in FIG. 1D according to some implementations. The lengthwise section of the flexible member 106 is in the flattened configuration. As shown in FIG. 3A, the flexible member 106 is generally a heterogeneous layered structure, including multiple distinct layers having different material properties. The flexible member 106 includes an outer layer 128 laminated on an inner layer 130. The outer layer 128 is formed of a textile or cloth, such as a nylon, an acrylic, a canvas, or a polyester fabric. Alternatively, the outer layer 128 is formed of a rubber or rubber-like material such as, for example, neoprene or polychloroprene. The inner layer 130 is formed of a polymer, such as polycarbonate, polypropylene, or polyethylene. The outer layer 128 is less rigid than the inner layer 130.

In some examples, the outer layer 128 has a thickness T1 between 0.1 and 1 mm, e.g., between 0.1 and 0.8 mm, 0.2 and 0.9 mm, or 0.3 mm and 1 mm. The inner layer 130 has a thickness T2 between 0.1 and 1 mm, e.g., between 0.1 and 0.8 mm, 0.2 and 0.9 mm, or 0.3 mm and 1 mm. The overall thickness of the flexible material 106, e.g., the sum of the thicknesses T1 and T2, is between 0.2 and 2 mm, e.g., between 0.2 and 1.6 mm, 0.4 and 1.8 mm, or 0.6 mm and 2 mm. The thickness T1 of the outer layer 128 is between 30% and 70% of the overall thickness of the flexible member 106, e.g., between 35% and 65%, 40% and 60%, or 45% and 55% of the overall thickness of the flexible member 106. The thickness T2 of the inner layer 130 is between 30% and 70% of the overall thickness of the flexible member 106, e.g., between 35% and 65%, 40% and 60%, or 45% and 55% of the overall thickness of the flexible member 106.

The section of the flexible member 106 is substantially flat in the flattened configuration. For example, a flatness of the flexible member 106 is between 0.1 and 1 mm, e.g., between 0.1 mm and 0.5 mm or 0.5 mm and 1 mm. To shape a lengthwise section of the flexible member 106 into the curled configuration, a first lateral edge 132a of the outer layer 128, e.g., corresponding to a first lateral edge of the flexible member 106, and a second lateral edge 132b of the outer layer 128, e.g., corresponding to a second lateral edge of the flexible member 106 are brought together and affixed or fastened to one another. This causes the section of the flexible member 106 to be curled around the longitudinal axis A1 (shown in FIGS. 2C and 2D). The robot 100 includes a fastener for affixing or fastening the first and second lateral edges 132a, 132b together when the lengthwise section is curled about the longitudinal axis A1. For example, the fastener includes multiple distinct portions, with one portion being attached to the first lateral edge 132a and another portion being attached to the second lateral edge 132b. The outer layer 128 includes a fastener portion 134a attached to the first lateral edge 132a and a fastener portion 134b attached to the second lateral edge 132b. The fastener portion 134a extends along a length of the first lateral edge 132a, and the fastener portion 134b extends along a length of the second lateral edge 132b.

In some implementations, the fastener portions 134a, 134b form a zipper mechanism. In some examples, the zipper mechanism corresponds to a zipper mechanism for connecting garments, fabrics, and other flexible textile materials. The zipper mechanism is a standard intermeshed zipper. The zipper mechanism includes interlocking clasps arranged on both of the lateral edges 132a, 132b. The fastener portion 134a corresponds to one of the sets of clasps of the zipper mechanism, and the fastener portion 134b corresponds to the other of the sets of clasps of the zipper mechanism. The fastener portions 134a, 134b are configured to be interlocked to connect the lateral edges 132a, 132b to one another.

Alternatively, the zipper mechanism corresponds to a zipper mechanism for connecting plastic materials. The zipper mechanism includes interlocking plastic material for connecting the lateral edges 132a, 132b. The zipper mechanism includes a first portion that press-fits into a second portion, the first portion corresponding to one of the fastener portions 134a, 134b and the second portion corresponding to the other of the fastener portions 134a, 134b. In some examples of such zipper mechanisms, the zipper mechanism includes a ridge (e.g., the fastener portion 134a) along one of the lateral edges 132a, 132b and a cavity (e.g., the fastener portion 134b) along the other of the lateral edges 132a, 132b. The lateral edges 132a, 132b are connected to one another when the cavity receives the ridge and thereby forms a press-fit connection with the ridge.

Alternatively, the fastener portions 134a, 134b are affixed or fastened to one another through a hook-and-loop mechanism, with one of the fastener portions 134a, 134b including hook-engageable material and the other of the fastener portions 134a, 134b including hooks. In some implementations, the fastener portions 134a, 134b include magnetically attractive material. The fastener portions 134a, 134b are magnetically attracted to one another and thus join the lateral edges 132a, 132b when the fastener portions 134a, 134b are brought in close proximity to one another.

FIG. 3B shows a cross-section of the flexible member 106 and components enclosed within the flexible member 106 along section lines 3B-3B in FIG. 1D. The flexible member 106 is in the curled configuration. In the curled configuration, the flexible member 106 is curled around the longitudinal axis A1 (shown in FIGS. 2C and 2D) and forms a conduit 136 around a portion the cable 138 (illustrated in FIG. 3B as a cross section of the cable).

The cable 138 provides an interface between the controller 114 and the image capture device 102. For example, the cable 138 electrically connects the image capture device 102 to the controller 114 of the robot. In some implementations, the cable 138 includes a data communication cable such that data indicative of the imagery captured by the image capture device 102 is transmittable to the controller 114 and such that the controller 114 can transmit control signals to operate the image capture device 102. In some implementations, the cable 138 further includes a power cable that enables power from a power source of the robot 100 to be delivered to the image capture device 102. Referring briefly to FIG. 2D, when the image capture device 102 is protracted from the body 108, the cable 138 extends along at least a length of the protracted section of the flexible member 106, e.g., the length of the flexible member 106 between the body 108 and the image capture device 102. The cable 138 thus provides electrical communication between the image capture device 102 and the controller 114 to enable control of the image capture device 102 as the image capture device 102 is protracted from the body 108.

Figure 4:
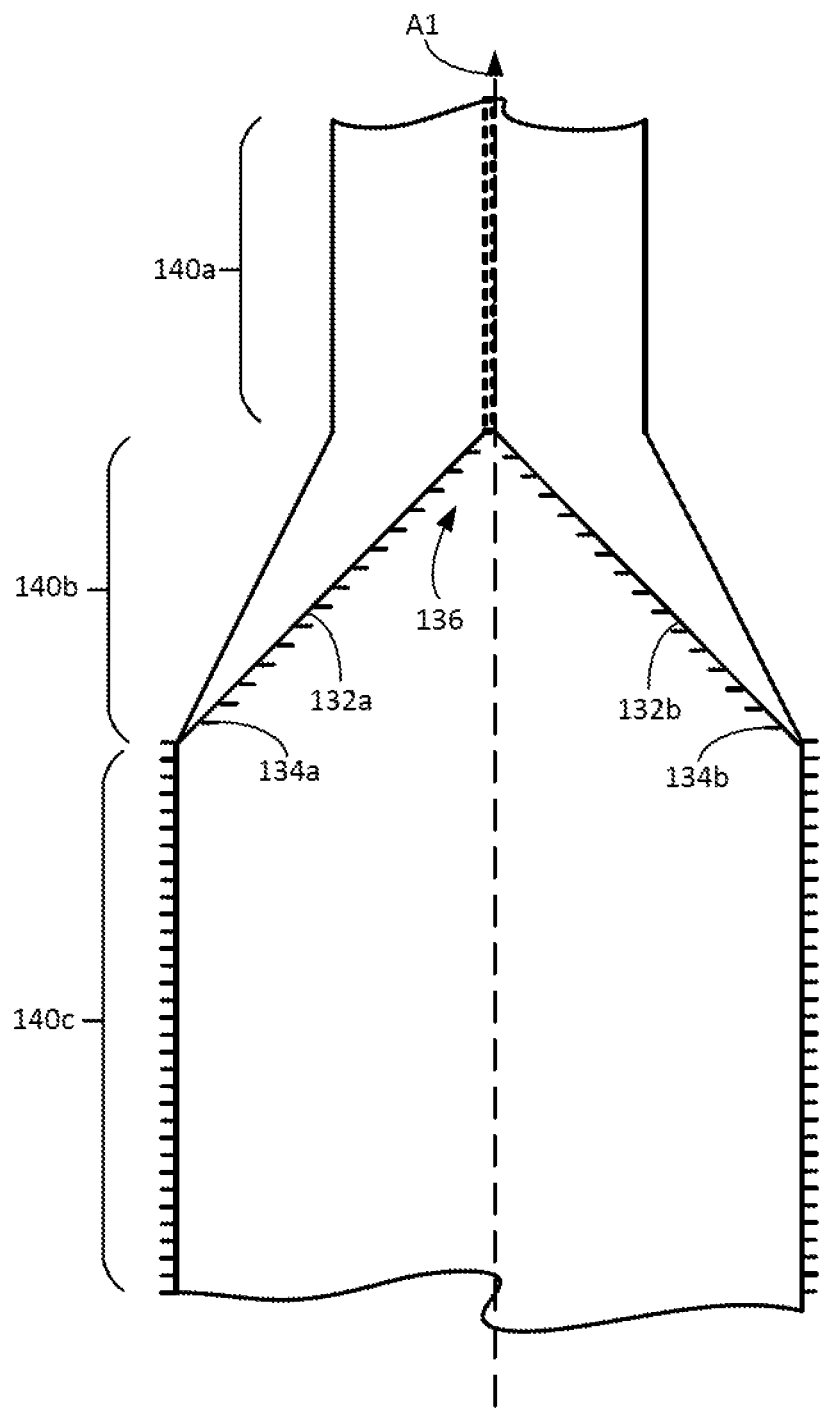
FIG. 4 is a front view of a flexible member.

FIG. 4 shows multiple lengthwise sections 140a, 140b, 140c of the flexible member 106 illustrating the transition from the flattened configuration to the curled configuration (and vice versa). The lengthwise sections 140a, 140b, 140c are positioned along the longitudinal axis A1. Only portions of the section 140a and the section 140c are visible. The section 140a is arranged in the curled configuration, and the section 140c is arranged in the flattened configuration. The section 140a extends at least from the distal portion 120 (shown in FIG. 2D) to proximate the body 108. The section 140a, in the curled configuration, surrounds a portion of the cable 138 extending out of the body 108, e.g., due to protraction of the image capture device 102 out of the body 108.

The fastener portion 134a is connected to the fastener portion 134b along the section 140a to form the conduit 136. This thereby connects the first and second lateral edges 132a, 132b along the section 140a as the flexible member 106 is uncoiled. When the first and second lateral edges 132a, 132b along the section 140a of the flexible member 106 are connected to one another, due to the rigidity of the inner layer 130, the inner layer 130 radially supports the outer layer 128 along the section 140a of the flexible member 106. This allows the conduit 136 to be substantially cylindrical along the length of the section, e.g., along the length of the protracted section of the flexible member 106. For example, the conduit 136 is substantially cylindrical between the body 108 and the image capture device 102. As a result, in this curled configuration, the flexible member 106 is rigid and capable of supporting the image capture device 102 above the body 108 of the robot 100 without collapsing or buckling when the distal portion 120 and the image capture device 102 are moved away from the body along the longitudinal axis A1 (shown in FIGS. 2C and 2D). In particular, the flexible member 106 has a buckling strength in the curled configuration higher than a buckling strength in the flattened configuration. In some implementations, the wall thickness of the flexible member 106 is enlarged without an increase in diameter of the curled formation of the extended flexible member 106, thereby increasing resistance to buckling under an increased weight of a payload atop the flexible member 106. In some implementations, the payload is the image capture device 102, and in other implementations, the payload may be larger, heavier payloads, such as, for example, a wireless router, a router repeater, a wirelessly connected audio media device, or a tablet and/or telephony device. For example, the ratio of wall thickness to diameter of the extended, curled flexible member 106 may be at or between 1:5 and 1:20, e.g., between 1:7 and 1:18, 1:8 and 1:16 and 1:9 and 1:14.

The section 140c of the flexible member 106, in the flattened configuration, is flattened so that it can be coiled within the body 108. As described herein, a lengthwise section of the flexible member 106 can be unfurled and transitioned from a curled configuration to a flattened configuration. The section 140b of the flexible member 106 is in a transition state between the curled configuration and the flattened configuration in which the section 140b of the flexible member 106 is curled about the longitudinal axis A1 but has a smaller curvature than the section 140a of the flexible member 106 and a larger curvature than the section 140c of the flexible member 106. The curvature of the section 140b decreases from its end connected to the section 140a to its end connected to the section 140c. In this regard, the portion of the section 140b closer to the section 140a is flatter than the portion of the section 140b closer to the section 140c. If the flexible member 106 is uncoiled, at least a portion of the section 140b is transitioned to the curled configuration. If the flexible member 106 is coiled, at least a portion of the section 140b is transitioned to the flattened configuration.

In some examples, the conduit 136 has a diameter D1 between 0.5 cm and 2.5 cm, e.g., between 0.5 and 2 cm, 0.75 and 1.5 cm, or 1 and 1.25 cm. In this regard, a circumference of the conduit 136 is between 3.14 cm and 15.7 cm, e.g., between 4 and 15 cm, 4.5 and 12 cm, or 5 and 10 cm. The circumference of the conduit 136 is defined by the sum of a width W1 of the flexible member 106 and the widths of the fastener portions 134a, 134b when the fastener portions 134a, 134b are connected to one another. The width W1 of the flexible member 106 is between 60 and 120 mm, e.g., between 70 and 110 mm, 80 and 100 mm, or 90 and 100 mm.

Figure 5A:
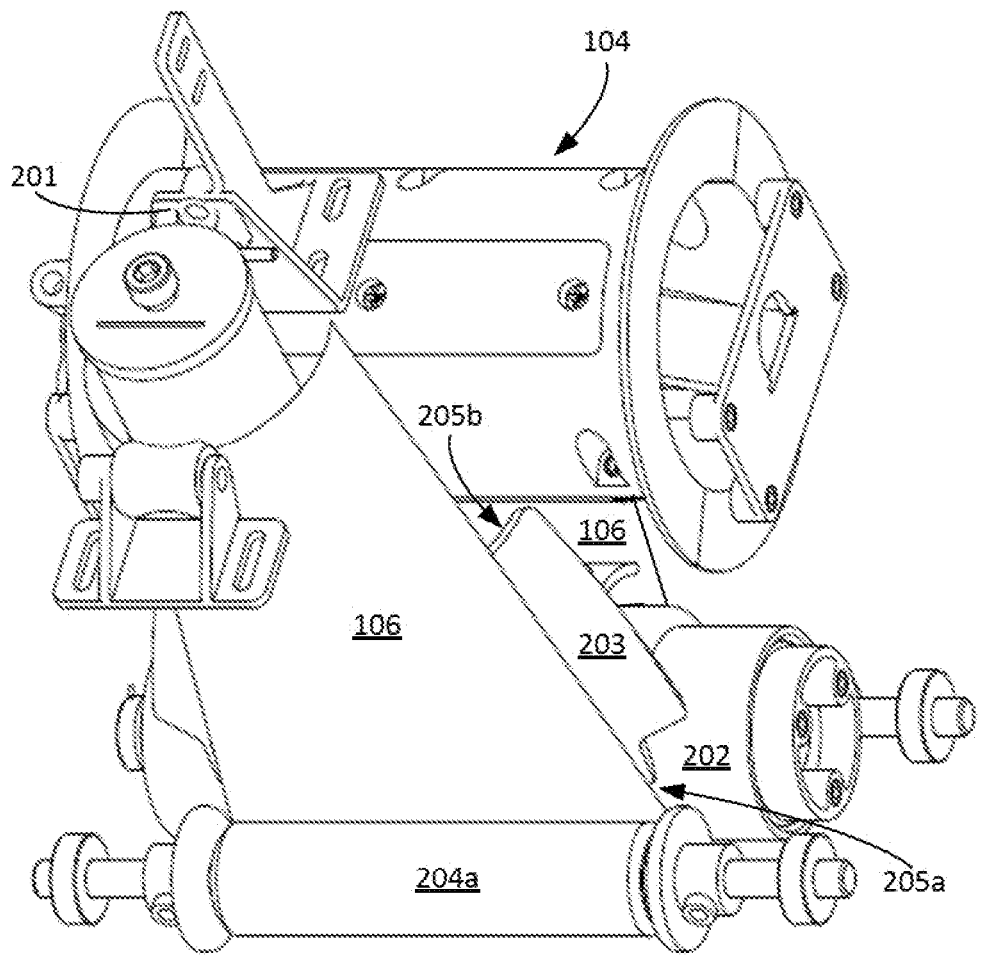
FIGS. 5A and 5B are perspective and side views, respectively, of a mast system.
Figure 5B:
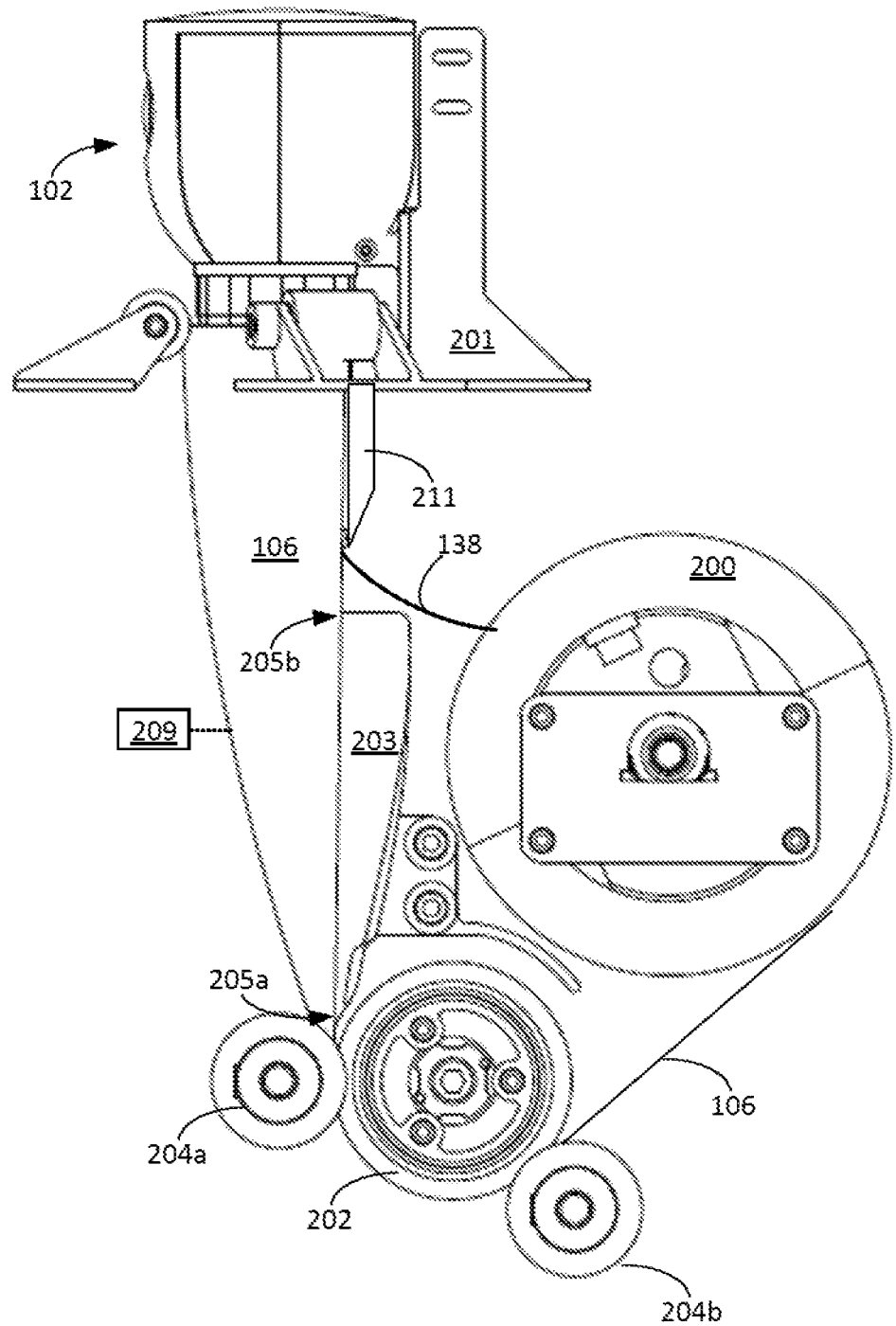

FIGS. 5A and 5B illustrate an example of a mechanism of the mast system 104 to coil the flexible member 106 while unfastening the lateral edges 132a, 132b of the flexible member 106 or to uncoil the flexible member 106 while fastening the lateral edges 132a, 132b of the flexible member 106. The mast system 104 includes a fastening and unfastening device 201 positioned below a top surface of the body 108, e.g., the top surface 121 of the body 108 (shown in FIG. 2C). For example, if the fastener is a zipper mechanism, the device 201 is configured to engage the first fastener portion 134a and the second fastener portion 134b to zip the fastener portion 134a, 134b, thereby connecting the lateral edges 132a, 132b of the flexible member 106. The device 201 causes, one-by-one, clasps of the first fastener portion 134a to be engaged to clasps of the second fastener portion 134b. In some implementations, the device 201 is a passive device. For example, the device 201 is stationary and passively engaged to the flexible member 106 as the flexible member 106 moves along the device 201. For example, in some implementations, the first and second fastener portions 134a, 134b are the toothed sides of a zipper and the device 201 is a stationary protrusion holding the zipper slider within the body of the robot 100 so that the teeth enmesh and unzip as the flexible member 106 extends and protracts (e.g., furls and unfurls). Alternatively or additionally, the device 201 is an active device. For example, the device 201 includes an actuator configured to actuate the device 201. The controller 114 is configured to control the actuator to engage the first and second fastener portions 134a, 134b such that the first and second fastener portions 134a, 134b are connected to one another.

The device 201 is configured to connect the first fastener portion 134a with the second fastener portion 134b to form the conduit 136 when the distal portion 120 of the flexible member 106 and the image capture device 102 (not shown in FIG. 5A but shown in FIG. 5B) are extended away from the body 108. When a portion of the flexible member 106 is protracted from the body 108, the device 201 connects the first and second fastener portions 134a, 134b at least along a length of the protracted portion of the flexible member 106. The device 201 is also configured to disconnect the first fastener portion 134a with the second fastener portion 134b when the distal portion 120 and the image capture device 102 are retracted toward the body 108. When a portion of the flexible member 106 is retracted into the body 108, the device 201 disconnects the first and second fastener portions 134a, 134b at least along a length of the retracted portion of the flexible member 106.

The mast system 104 includes a ramp 203 shaped to facilitate transition of a section of the flexible member 106 from a flattened configuration to a curled configuration when the distal portion 120 is extended from the body 108 or from a curled configuration to a flattened configuration when the distal portion 120 is retracted toward the body 108. The ramp 203 is a rigid structure that shapes the flexible member 106 as the flexible member 106 passes over the ramp 203. The ramp 203 extends away from the drive roller assembly 202 from a first end 205a proximate the drive roller assembly 202 to a second end 205b proximate a location on the body 108 through which the flexible member 106 is movable to an exterior of the body 108, e.g., proximate the opening 118. Tension in the flexible member 106 tends to draw the flexible member 106 against the ramp 203. The ramp 203 encourages the flexible member 106 to curl into the curled configuration as the flexible member 106 is extended from the body 108, and encourages the flexible member 106 to flatten into the flattened configuration as the flexible member 106 is retracted into the body 108. The ramp 203 is configured to contact the flexible member 106 to inhibit the flexible member 106 from buckling and to control the curvature of the flexible member 106 as the flexible member 106 is moved along the ramp 203. In this regard, a curvature of the ramp 203 increases along a length of the ramp 203 from the first end 205a toward the second end 205b of the ramp 203.

In addition, the ramp 203 serves to separate the flexible member 106 from the cable 138. The cable 138 is separated from the flexible member 106 at a location above the ramp 203. As a result, the flexible member 106 follows a path from the opening 118 to the spool assembly 200 distinct from a path of the flexible member 106 from the opening 118 to the spool assembly 200. The path for the flexible member 106 extends from the opening 118 (shown in FIG. 2C), along the ramp 203, the drive roller assembly 202, and the compressing rollers 204, and to the spool assembly 200. The path for the cable 138 extends from the opening 118 directly to the spool assembly 200, e.g., above the ramp 203. As a result, the cable 138 can be separately spooled from the flexible member 106 on the spool assembly 200, thereby preventing the cable 138 and the 106 from becoming entangled.

The robot 100 includes a rigid nest 211 positioned within the body 108 of the robot 100 to receive the image capture device 102. In particular, the rigid nest 211 receives the image capture device 102 when the image capture device 102 is in the fully retracted position. The rigid nest 211 defines the fully retracted position of the image capture device 102 by inhibiting further retraction of the image capture device 102.

Figure 6A:
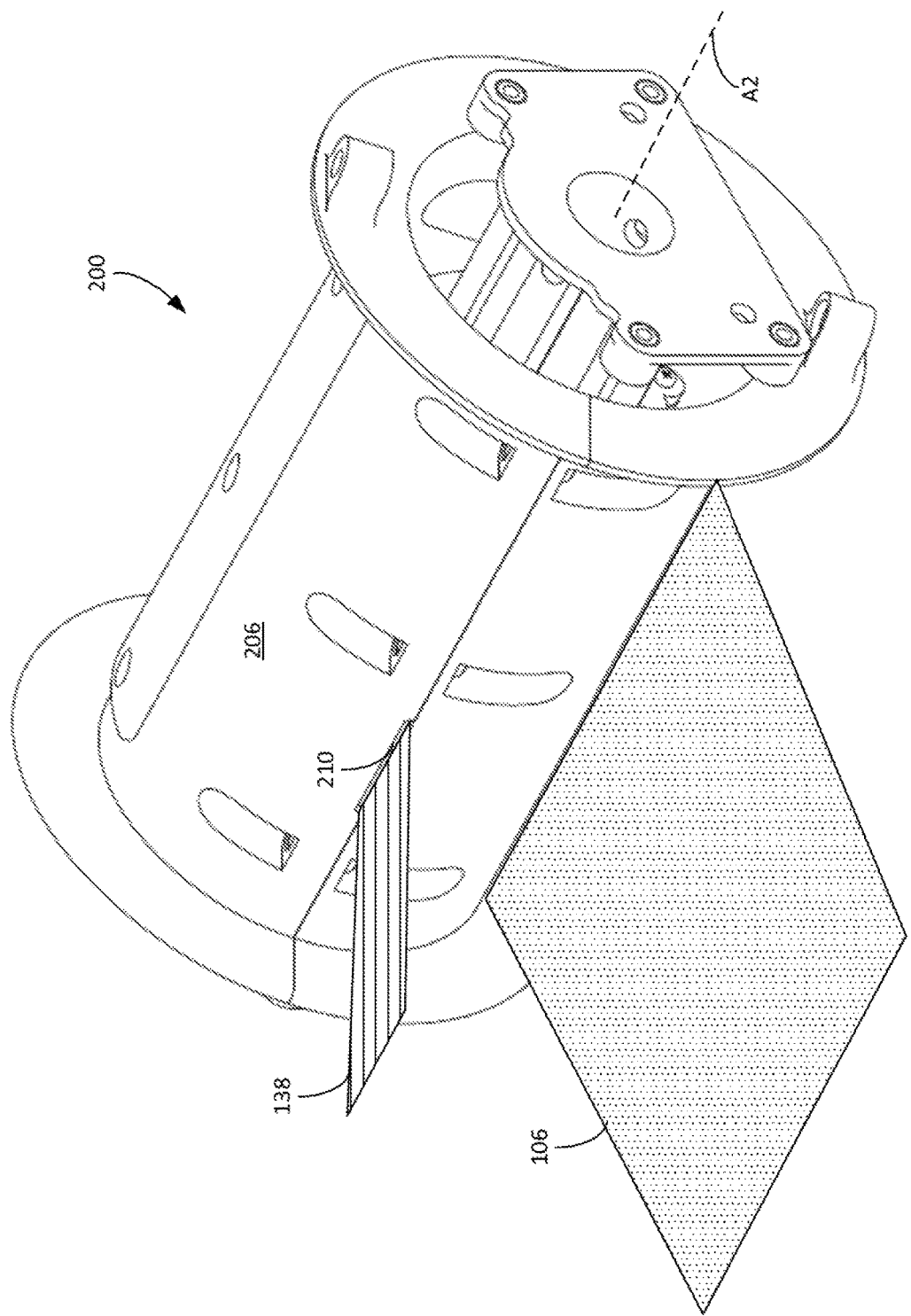
FIGS. 6A-6D are perspective, perspective exploded, front cross-sectional, and side cross-sectional views, respectively, of a spool assembly of the mast system of FIG. 3A.
Figure 6B:
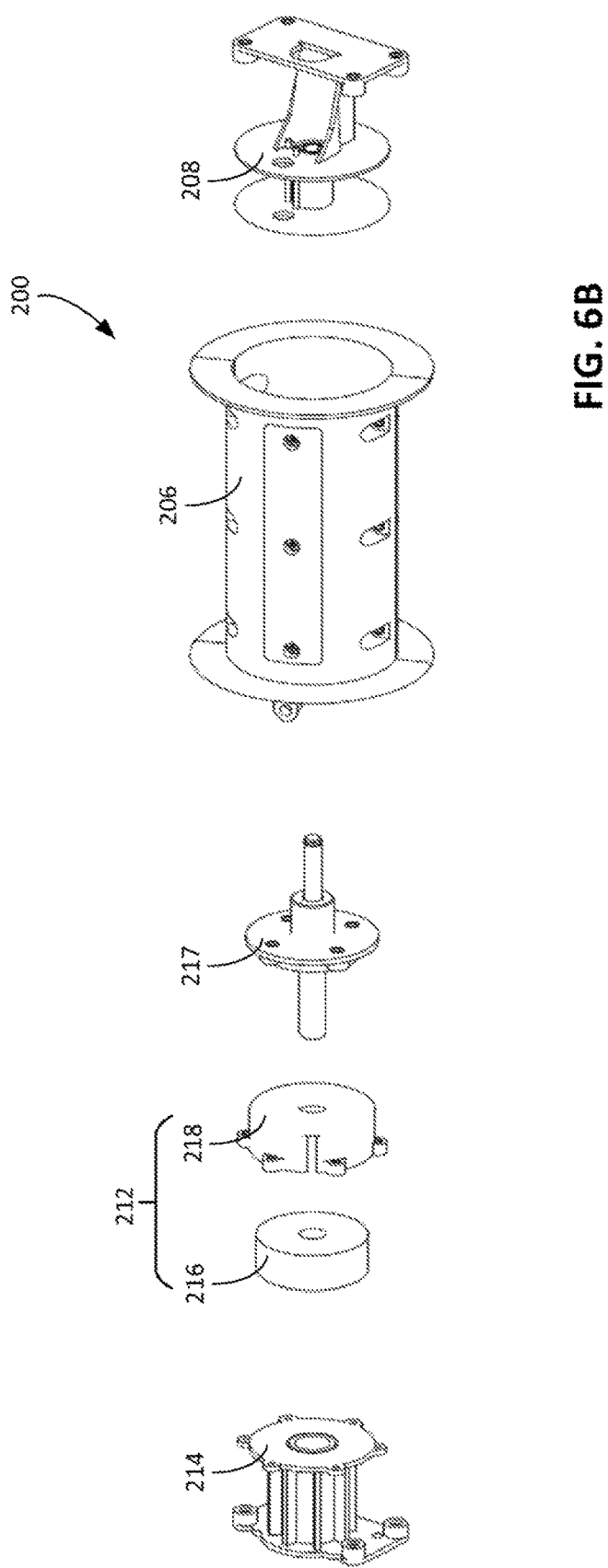
Figure 6C:
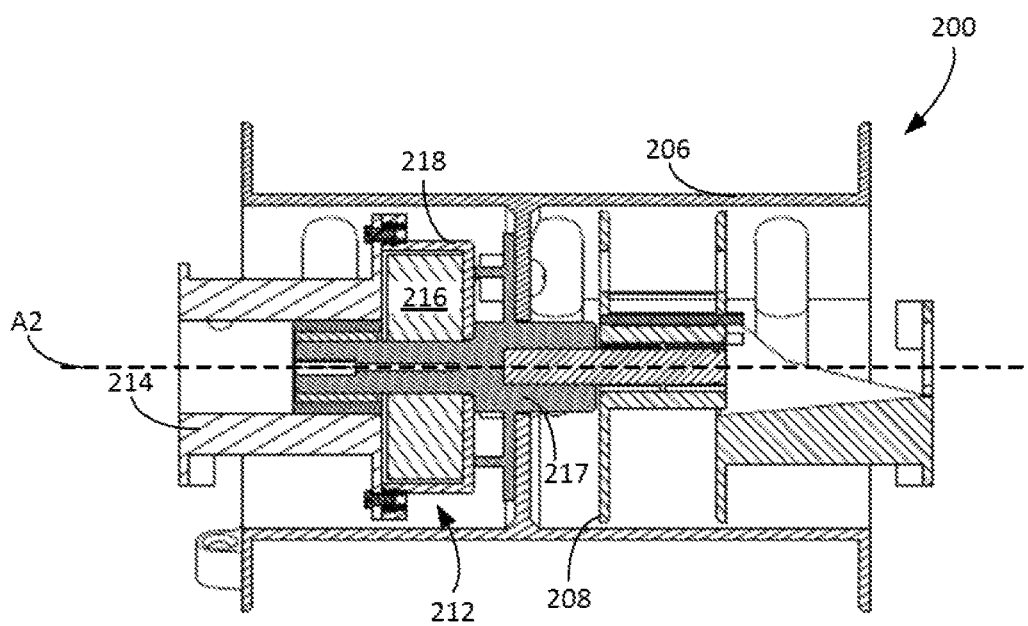

Referring also to FIG. 6A, the cable 138 is coiled when the flexible member 106 is coiled about the spool assembly 200, and is uncoiled when the flexible member 106 is uncoiled from the spool assembly 200. Referring to FIGS. 6B and 6C, the flexible member 106 and the cable 138 are separately spooled about the spool assembly 200, with the flexible member 106 being coiled about an outer portion of the spool assembly 200 and the cable 138 being coiled about an inner portion of the spool assembly 200. The flexible member 106 is coiled about an outer spool 206, and the cable 138 is coiled about an inner spool 208. The inner spool 208 is telescoped within the outer spool 206. The inner spool 208 and the outer spool 206 are concentric. For example, a central axis of the outer spool 206 is coincident with a central axis of the inner spool 208. These central axes correspond to a rotational axis A2 of the spool assembly 200.

An outer surface of the outer spool 206 about which the flexible member 106 is coiled has a diameter D2 (shown in FIG. 6D) between 40 and 80 mm, e.g., between 45 mm and 75 mm, 50 and 70 mm, or 55 and 65 mm. An outer surface of the inner spool 208 about which the cable 138 is coiled has a diameter D3 (shown in FIG. 6D) between 5 and 30 mm, e.g., between 5 and 20 mm, 10 and 25 mm, or 15 and 30 mm. The diameter D3 is between 10% and 50% of the diameter D2, e.g., between 10% and 35%, 15% and 40%, 20% and 45%, or 25% and 50% of the diameter D1.

The cable 138 is routed through an opening 210 (shown in FIG. 6A) along the outer spool 206. The opening 210 provides the cable 138 with access to an interior of the spool assembly 200 where the inner spool 208 is located. For example, the opening 210 is a slit on the outer spool 206 extending parallel to the rotational axis A2. The cable 138 extends through the opening 210 to engage the inner spool 208.

The inner spool 208 is fixed to the body 108 of the robot 100. The spool assembly 200 includes a spring assembly 212. The spring assembly 212 includes a spring 216 positioned within a housing 218 fixed to a mounting device 214 fixed to the body 108 (not shown) of the robot 100. In some examples, the spring 216 is a clock spring or other spring that is energized in response to rotation. The spring 216 has a first end coupled to the housing 218 or the mounting device 214 and a second end coupled to a drive axle 217.

The drive axle 217 is rotatable relative to the inner spool 208 and is rotationally coupled to the outer spool 206. As a result, the spring 216 is arranged to bias the drive axle 217, cause rotation of the drive axle 217, and thereby cause rotation of the outer spool 206. The spring 216 is also configured to be tensioned in response to rotation of the drive axle 217. The drive axle 217 has a first end rotatably coupled to the spring assembly 212 and a second end rotatably coupled to the inner spool 208. The outer spool 206 is rotationally coupled to the drive axle 217 at a center portion of the drive axle 217. As a result, the spring 216 is tensioned when the outer spool 206 is rotated in a first direction and is configured to rotate the outer spool 206 in a second direction when the spring 216 is released. During protraction, the outer spool 206 rotates relative to the inner spool 208 in the first direction to feed out the flexible member 106. During retraction, the outer spool 206 rotates relative to the inner spool 208 in the second direction to draw in the flexible member 106 and wind the flexible member 106 about the outer spool 206.

Figure 6D:
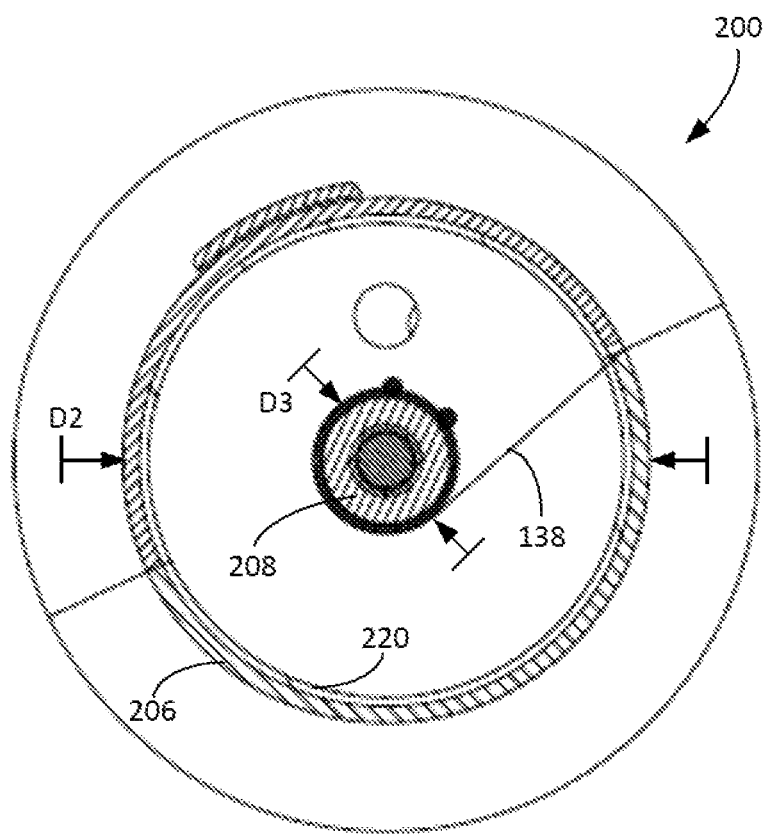

Referring to FIG. 6D, the cable 138 is contained within the outer spool 206 when coiled within the body 108 (not shown). During protraction, the cable 138 is fed out of the outer spool 206 through rotation of the outer spool 206 as an inner surface 220 of the outer spool 206 contacts the cable 138. This contact ensures that the cable 138 is driven by rotation of the outer spool 206. During retraction, the cable 138 is drawn into the outer spool 206 through rotation of the outer spool 206 and is wound about the inner spool 208 due to contact between the cable 138 and the inner surface 220 of the outer spool 206.

The cable 138 and the flexible member 106 are attached to the spool assembly 200 such that a tension in the flexible member 106 is greater than a tension in the cable 138. For example, the cable 138 is slack while the flexible member 106 is taut. By being slack, the cable 138 can be less prone to damage when the flexible member 106 is protracted and retracted. When the flexible member 106 and the cable 138 are coiled about the spool assembly 200, the flexible member 106 is wound more tightly around the outer spool 206 than the cable 138 is wound about the inner spool 208. In some examples, the cable 138, when coiled about the inner spool 208, is arranged around the inner spool 208 such that the cable 138 follows a path along the inner surface 220 of the outer spool 206 facing the inner spool 208. Slack in the cable 138 can cause the cable 138 to be biased radially outward from the inner spool 208. As a result, the cable 138 contacts the inner surface 220 of the outer spool 206 when the cable 138 is coiled about the inner spool 208. This contact can provide friction between the outer spool 206 and the cable 138 so that rotation of the outer spool 206 causes the cable 138 to be coiled or uncoiled.

Figure 7A:
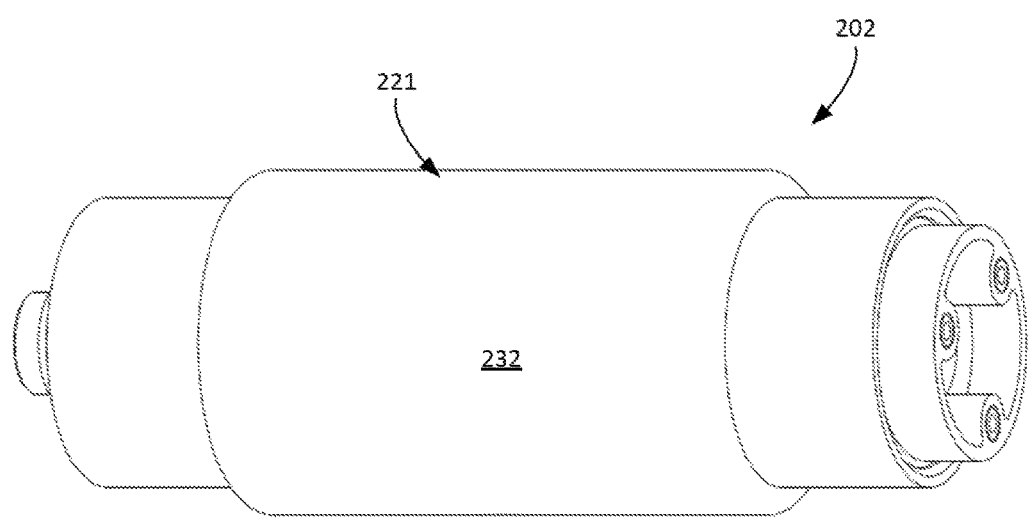
FIGS. 7A-7C are perspective, perspective exploded views, and front cross-sectional, respectively, of a drive roller assembly of the mast system of FIG. 3A.
Figure 7B:
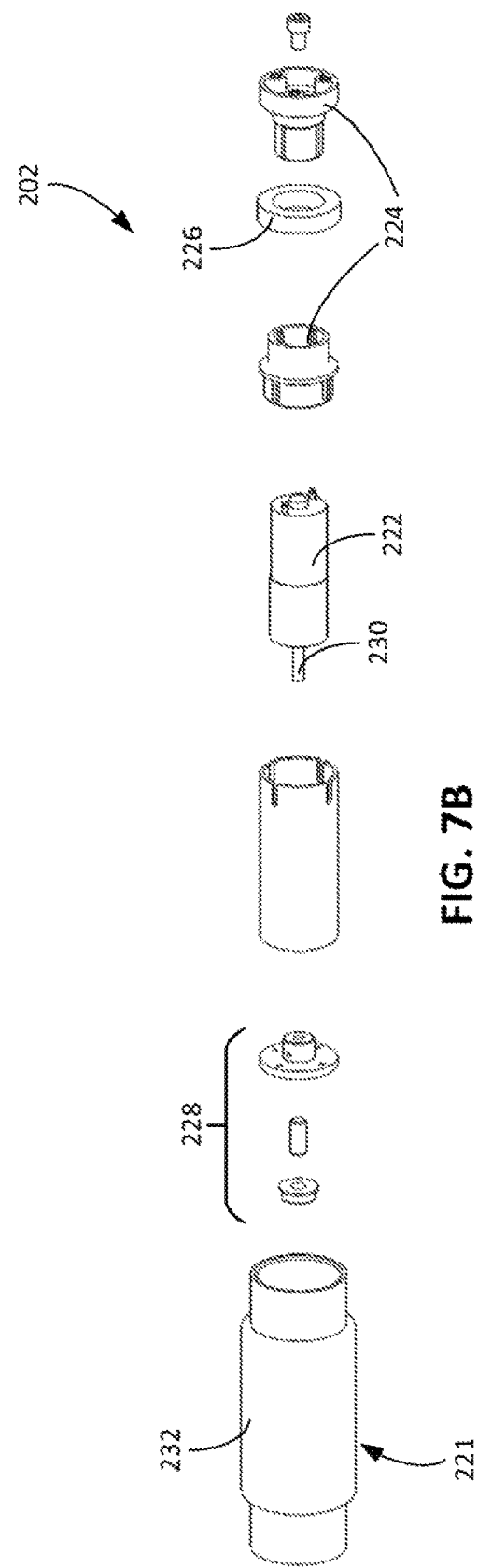
Figure 7C:
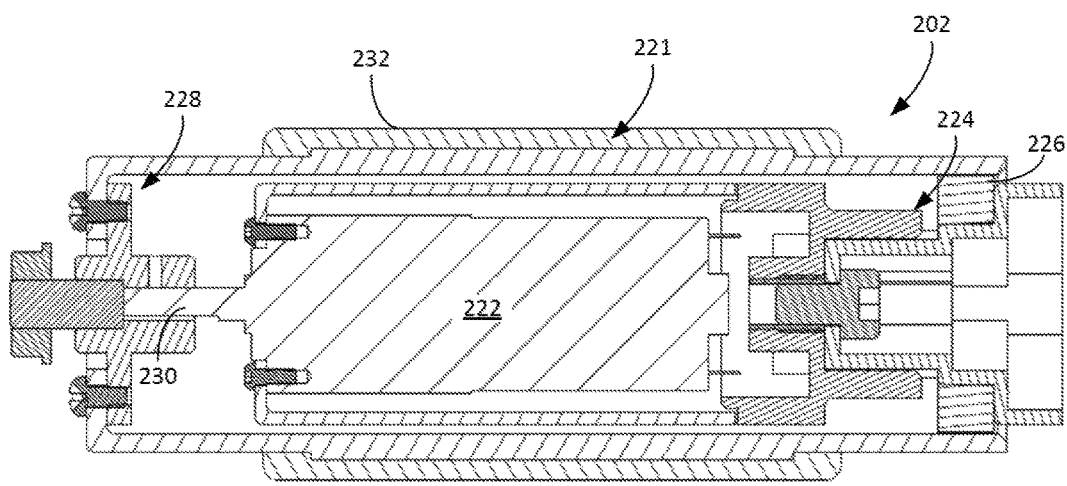

Referring to FIG. 7A, the drive roller assembly 202 includes a drive roller 221 rotatable to coil or uncoil the flexible member 106 and the cable 138. Referring to FIGS. 7B and 7C, the drive roller assembly 202 includes a motor 222 operable to rotate the drive roller 221. The motor 222 is positioned within drive roller 221. This can reduce the amount of space in the body 108 required for housing the drive roller assembly 202. The drive roller assembly 202 further includes a motor mount 224 positioned on one end of the drive roller 221. The motor mount 224 is configured to mount the motor 222 to the body 108 of the robot 100. The drive roller assembly 202 also includes a bearing 226 positioned on the motor mount 224 to allow for rotation between the drive roller 221 and the motor mount 224. A drive coupler 228 of the drive roller assembly 202 couples a shaft 230 of the motor 222 to the drive roller 221. The drive coupler 228 thus enables rotation of the motor shaft 230 to cause rotation of drive roller 221.

The motor 222 is operably connected to the controller 114 so that the controller 114 can control rotation of the motor 222 and thereby control a height of the image capture device 102. In particular, the controller 114 operates the motor 222 to control an amount of the flexible member 106 that is protracted from the body 108 of the robot 100. The protracted amount defines the height of the image capture device 102 above the floor surface.

The motor 222 is configured to be driven to rotate the motor shaft 230 and hence the drive roller 221 is in a first direction, e.g., clockwise in the perspective as shown in FIG. 5B, to cause the flexible member 106 and the cable 138 to be uncoiled from the spool assembly 200. The compressing rollers 204 compress a portion of the flexible member 106 against the drive roller 221 to maintain contact between the flexible member 106 and an outer surface 232 of the drive roller 221 when the drive roller 221 is rotated. The compressing rollers 204 provide a normal force on the flexible member 106 against the drive roller 221, thereby providing friction between the flexible member 106 and the drive roller 221. This ensures that rotation of the drive roller 221 applies a force to the flexible member 106 to uncoil the flexible member 106 from the spool assembly 200. The force generates tension in the flexible member 106 that drives the spool assembly 200 to rotate and thereby release spooled portions of the flexible member 106.

The motor 222 is also configured to be driven to rotate the motor shaft 230 and hence the drive roller 221 in a second direction, e.g., counterclockwise in the perspective as shown in FIG. 5B, to cause the flexible member 106 and the cable 138 to be coiled about the spool assembly 200. Rotation of the drive roller 221 applies a force to a portion of the flexible member 106 that moves the portion of the flexible member 106 toward the spool assembly 200. The drive roller 221 feeds the portion of the flexible member 106 to the spool assembly 200. The spring 216 rotates the spool assembly 200 to draw in the portion of the flexible member 106 as the drive roller 221 feeds the portion of the flexible member 106 to the spool assembly 200. In this regard, the spring 216 allows for a non-motorized way of rotating the spool assembly 200.

To control the height to which the distal portion 120 of the flexible member 106 is extended, the robot 100 can monitor the position of the flexible member 106 during retraction and protraction of the flexible member 106. The robot 100 includes a sensor to detect motion of the flexible member 106 as the flexible member 106 is coiled and uncoiled. The controller 114 is configured to determine a length of an uncoiled portion or a length of a coiled portion of the flexible member 106 based on the motion of the flexible member 106 detected by the sensor. For example, an encoder associated with the motor 222 measures the amount of the flexible member 106 fed out of or drawn into the spool assembly 200. Alternatively or additionally, the sensor includes an optical sensor 209 (shown in FIG. 5B) positioned to detect motion of the flexible member 106 as the flexible member 106 is fed out of the body 108 or drawn into the body 108. The optical sensor 209 is an optical motion sensor that tracks cumulative motions of the flexible member 106. The controller 114 is configured to determine the height of the distal portion 120 of the flexible member 106 based on this tracked motion.

A number of implementations have been described. Nevertheless, it will be understood that various modifications may be made.

For example, in some implementations, the environment 10 includes one or more enclosed spaces such as a set of multiple rooms or spaces defined by a structure or a building, e.g., a home, a residential dwelling, a single family home, a multi-family dwelling, a unit of a duplex, apartment, or condominium, a mobile home, or a commercial living space, an office, a studio, a manufacturing plant, etc.

In some implementations, data indicative of the digital imagery generated by the image capture device 102 is transmitted to a remote computing device. The remote computing device, in some cases, includes a display to present the digital imagery to a user so that the user can monitor an object captured in the digital imagery. Alternatively or additionally, data representing the captured images and/or detected conditions are transmitted to a network, e.g., the Internet. The data are accessible by a user terminal through a portal on the network. The user terminal is operable to present views of the enclosure space formed from imagery captured by the robot from multiple locations and directions. The views include views of the enclosure space from multiple vantage points to provide the user with a visual representation of surroundings of the robot within the enclosure space.

The flexible member 106 is described as being movable vertically away from the body 108 of the robot 100. In some implementations, the flexible member 106 is movable both vertically and horizontally away from the body 108 of the robot 100. In this regard, rather than moving only along a vertical axis away from the floor surface 20, the image capture device 102 moves along an axis at a non-perpendicular angle relative to the floor surface 20. In some implementations, rather than moving vertically away from the body 108 of the robot 100, the image capture device 102 is moved horizontally away from the body 108 of the robot 100. This type of movement allows the image capture device 102 to be repositioned to capture imagery in areas that the robot 100 cannot reach through movement along the floor surface 20, e.g., under furniture, around corners, etc.

The fastener portions 134a, 134b are described as being attached to the outer layer 128. In some implementations, the fastener portions 134a, 134b are integral to the outer layer 128. The fastener portions 134a, 134b are formed from the same material that forms the outer layer 128. For example, if the outer layer 128 is formed from a flexible polymer, the fastener portions 134a, 134b correspond to, in some cases, plastic features that, when mated with one another, connect lateral ends of the outer layer 128.

Alternatively or additionally, while both an inner layer 130 and an outer layer 128 are described, in some implementations, only one of the outer layer 128 and the inner layer 130 is present. In such cases, the flexible member 106 includes a single layer configured to be curled about the longitudinal axis and configured to support the image capture device 102. In addition, the single layer includes, in some cases, integral fastener portions 134a, 134b.

While the cable 138 is described as a ribbon cable, in some implementations, rather than a single electronics cable extending between the body 108 and the image capture device 102, multiple cables are present. For example, the robot 100 includes a data communication cable separate from a power delivery cable. The data communication cable and the power delivery cable are spooled about a single spool, e.g., the inner spool 208. Alternatively, the data communication cable and the power delivery cable are each spooled about its own distinct spool, e.g., positioned within the outer spool 206.

While the image capture device 102 is described to be supported by the distal portion 120 of the flexible member 106, in some implementations, another sensor is supported by the distal portion 120. The sensor provides a measurement that varies with location within the environment 10, e.g., varying with height and floor surface location. For example, the sensor includes one or more of a temperature sensor that measures a temperature within the environment 10, a moisture sensor that measures a moisture content of the environment 10, a pressure sensor such a barometer that measures a barometric pressure of the environment 10, an air quality sensor that measures an air quality of the environment 10, or a light sensor to detect ambient light in the environment 10.

In some implementations, rather than or in addition to including a sensor, the distal portion 120 of the flexible member 106 includes a mechanical end effector, such as a gripper, a suction cup, a rotatable member, or other end effector. The end effector is controllable by the controller 114 to perform an operation in the environment 10 in which the end effector interacts with an object in the environment 10. For example, if the mechanical end effector is a gripper, the end effector is operable to grasp an object, and the robot 100 is movable to reposition the grasped object in the environment 10.

While the cable 138 is described as an electrical cable, in some implementations, the cable 138 enables transmission of data or power through another medium. For example, cable 138 can be an optical cable that enables transmission of an optical signal indicative of data to be transmitted from the image capture device 102 to the controller 114.

Alternatively or additionally, the image capture device 102 is electrically isolated from the controller 114, and the cable 138 is absent. The image capture device 102 is powered by a battery supported by the distal portion 120 of the flexible member 106 and communicates data wirelessly to the controller 114. The image capture device 102 is operated by the controller 114 by receiving wireless command signals from the controller 114. In this regard, only the flexible member 106 is spooled about the spool assembly 200. Such examples can simplify the mast system 104, as only a single member, e.g., the flexible member 106, rather than multiple members, e.g., the flexible member 106 and the cable 138, is coiled and uncoiled to move the image capture device 102 vertically.

While two compressing rollers 204a, 204b are shown, in some implementations, a single compressing roller is present. For example, the compressing roller 204a proximate the ramp 203 is present while the compressing roller 204b is absent. This can further reduce the amount of space occupied by the mast system 104. Alternatively or additionally, two or more compressing rollers are used to compress the flexible member 106 against the drive roller assembly 202.

While a single spool assembly 200 is described and shown, in some implementations, the mast system 104 includes two or more distinct spool assemblies. For example, rather than being telescoped within the spool 206, the spool 208 is separate from the spool 206 and positioned outside of the spool 206. Corresponding springs, e.g., similar to the spring 216, are coupled to the spools 206, 208.

In addition, while the cable 138 and the flexible member 106 are described as being coiled about spools within the robot 100, in some implementations, the cable 138 or the flexible member 106 is stored in another configuration within the robot 100. For example, the flexible member 106 or the cable 138 is folded within a confined space in the body 108 of the robot 100.

While the spring 216 is described as providing torque to drive the spool assembly 200 for retraction of the flexible member 106 and the cable 138, in some implementations, another energy source is used to provide the torque. For example, the robot 100 includes another motor distinct from the motor 222. This other motor is configured to drive the outer spool 206 of the spool assembly 200 so that the outer spool 206 is rotated during retraction of the flexible member 106. Alternatively, the motor 222 is connected through a transmission system to the spool assembly 200. In this regard, the motor 222, when driven, causes rotation of the both the drive roller 202 and the outer spool 206.

While described as being usable with an autonomous mobile robot, in some implementations, the mast system 104 is usable with other devices in which a portion of the device is protractible or retractable. For example, in some implementations, the mast system 104 is part of a stationary support system for an image capture device, such as a tripod or monopod. In some implementations, the mast system 104 is part of a stationary image capture system mounted to the environment 10, e.g., for a home security system or commercial security system. In some implementations, the payload is a device other than an image capture device. For example, the mast system 104 may raise and lower devices during use and non-use states. For example, the mast system 104 may be part of a mobile or stationary apparatus or system that raises and lowers a wireless router or router repeater dynamically to improve signal strength within an environment when and where weaknesses are detected. In some implementations, the mast system 104 may be a stand-alone system for providing a retractable, protractable support mast for a payload.

The robots described herein can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations associated with controlling the robots described herein can be performed by one or more programmable processors executing one or more computer programs to perform the functions described herein. A computer program can be written in any form of programming language, including compiled or interpreted languages, and it can be deployed in any form, including as a stand-alone program or as a module, component, subroutine, or other unit suitable for use in a computing environment. Control over all or part of the robots described herein can be implemented using special purpose logic circuitry, e.g., an FPGA (field programmable gate array) and/or an ASIC (application-specific integrated circuit).

The controllers described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semi-conductor storage area devices, e.g., EPROM, EEPROM, and flash storage area devices; magnetic disks, e.g., internal hard disks or removable disks; magneto-optical disks; and CD-ROM and DVD-ROM disks.

Accordingly, other implementations are within the scope of the claims.

What is claimed is:

1. An autonomous mobile robot comprising:
a body;
a drive configured to maneuver the body across a floor surface;
an image capture device;
an interface cable connecting the image capture device to a controller of the robot, the interface cable being configured to be spooled within the body; and
an elongate flexible member including a polymer portion and a textile portion, the elongate flexible member including a first portion having a first curvature and being coupled to the image capture device, a second portion having a second curvature less than the first curvature and being coiled within the body of the robot, and a third portion having a curvature that varies between the first curvature and the second curvature, the third portion connecting the first portion to the second portion.

2. The autonomous mobile robot of claim 1, wherein the elongate flexible member is configured to be at least partially coiled within the robot about a spool, the second portion of the elongate flexible member being attached to the spool, the third portion of the elongate flexible member being distal to the second portion, and the first portion of the elongate flexible member being distal to the first portion.

3. The autonomous mobile robot of claim 1, wherein the elongate flexible member is vertically protractible from the body of the robot to move the first portion with the image capture device vertically away from the body of the robot to a height of at least 0.5 meters above the floor surface.

4. The autonomous mobile robot of claim 1, wherein the polymer portion is attached to the textile portion.

5. The autonomous mobile robot of claim 1, comprising a zipper attached to the textile portion of the elongate flexible member, the zipper being in a closed position in the first portion and an open position in the second and third portions.

6. The autonomous mobile robot of claim 5, comprising a ramp attached to the body of the robot and configured to support the third portion of the elongate flexible member to reduce buckling.

7. The autonomous mobile robot of claim 5, wherein a first portion of the zipper is positioned along a first lateral edge of the elongate flexible member, and a second portion of the zipper is positioned along a second lateral edge of the elongate flexible member.

8. The autonomous mobile robot of claim 7, further comprising a fastening and unfastening device positioned below a top surface of the body, the fastening and unfastening device being configured to connect the first portion of the zipper and the second portion of the zipper such that the flexible member forms a conduit around a portion of the interface cable.

9. The autonomous mobile robot of claim 1, wherein a thickness of the polymer portion of the elongate flexible member is between 0.1 and 1 millimeter, and a thickness of the textile portion is between 0.1 and 1 millimeter.

10. The autonomous mobile robot of claim 9, wherein the thickness of the polymer portion is between 30% and 70% of an overall thickness of the elongate flexible member.

11. The autonomous mobile robot of claim 1, further comprising a conduit within at least the first portion of the elongate flexible member, the conduit having a width between 0.5 centimeters and 2.5 centimeters.

12. The autonomous mobile robot of claim 1, wherein a width of the first portion of the elongate flexible member is between 60 millimeters and 120 millimeters.

13. The autonomous mobile robot of claim 1, wherein the second portion is substantially flat.

14. A protractible and retractable mast system for an autonomous mobile robot, the mast system comprising:
    an elongate flexible member including a polymer portion and a textile portion, the elongate flexible member including a first portion having a first curvature and being configured to be coupled to an image capture device of the robot, a second portion having a second curvature less than the first curvature and being configured to be coiled within the robot, and a third portion having a curvature that varies between the first curvature and the second curvature, the third portion connecting the first portion to the second portion; and
    a drive roller rotatable in a first direction to move the first portion of the elongate flexible member away from the robot, and rotatable in a second direction to move the first portion of the elongate flexible member toward the robot.

15. The mast system of claim 14, wherein the elongate flexible member is configured to be at least partially coiled within the robot about a spool, the second portion of the elongate flexible member being attached to the spool, the third portion of the elongate flexible member being distal to the second portion, and the first portion of the elongate flexible member being distal to the first portion.

16. The mast system of claim 14, wherein the polymer portion is attached to the textile portion.

17. The mast system of claim 14, comprising a zipper attached to the textile portion of the elongate flexible member, the zipper being in a closed position in the first portion and an open position in the second and third portions.

18. The mast system of claim 17, comprising a ramp configured to support the third portion of the elongate flexible member to reduce buckling.

19. The mast system of claim 17, wherein a first portion of the zipper is positioned along a first lateral edge of the elongate flexible member, and a second portion of the zipper is positioned along a second lateral edge of the elongate flexible member.

20. The mast system of claim 19, further comprising a fastening and unfastening device configured to connect the first portion of the zipper and the second portion of the zipper such that the flexible member forms a conduit for an interface cable of the robot.

21. The mast system of claim 14, wherein a thickness of the polymer portion of the elongate flexible member is between 0.1 and 1 millimeter, and a thickness of the textile portion is between 0.1 and 1 millimeter.

22. The mast system of claim 21, wherein the thickness of the polymer portion is between 30% and 70% of an overall thickness of the elongate flexible member.

23. The mast system of claim 14, further comprising a conduit within at least the first portion of the elongate flexible member, the conduit having a width between 0.5 centimeters and 2.5 centimeters.

24. The mast system of claim 14, wherein a width of the first portion of the elongate flexible member is between 60 millimeters and 120 millimeters.

25. The mast system of claim 14, wherein the second portion is substantially flat.

* * * * *